Figure 1B:
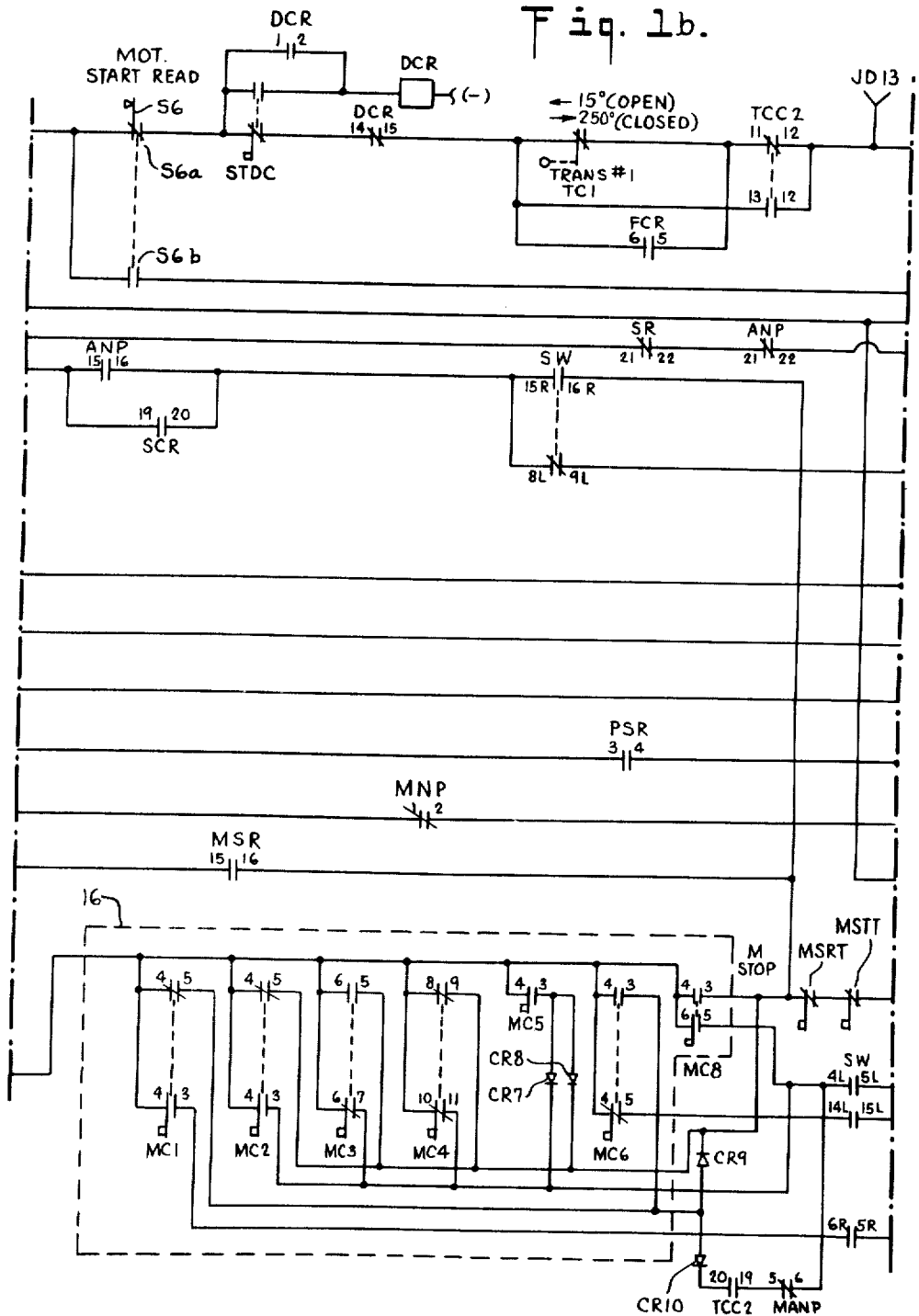

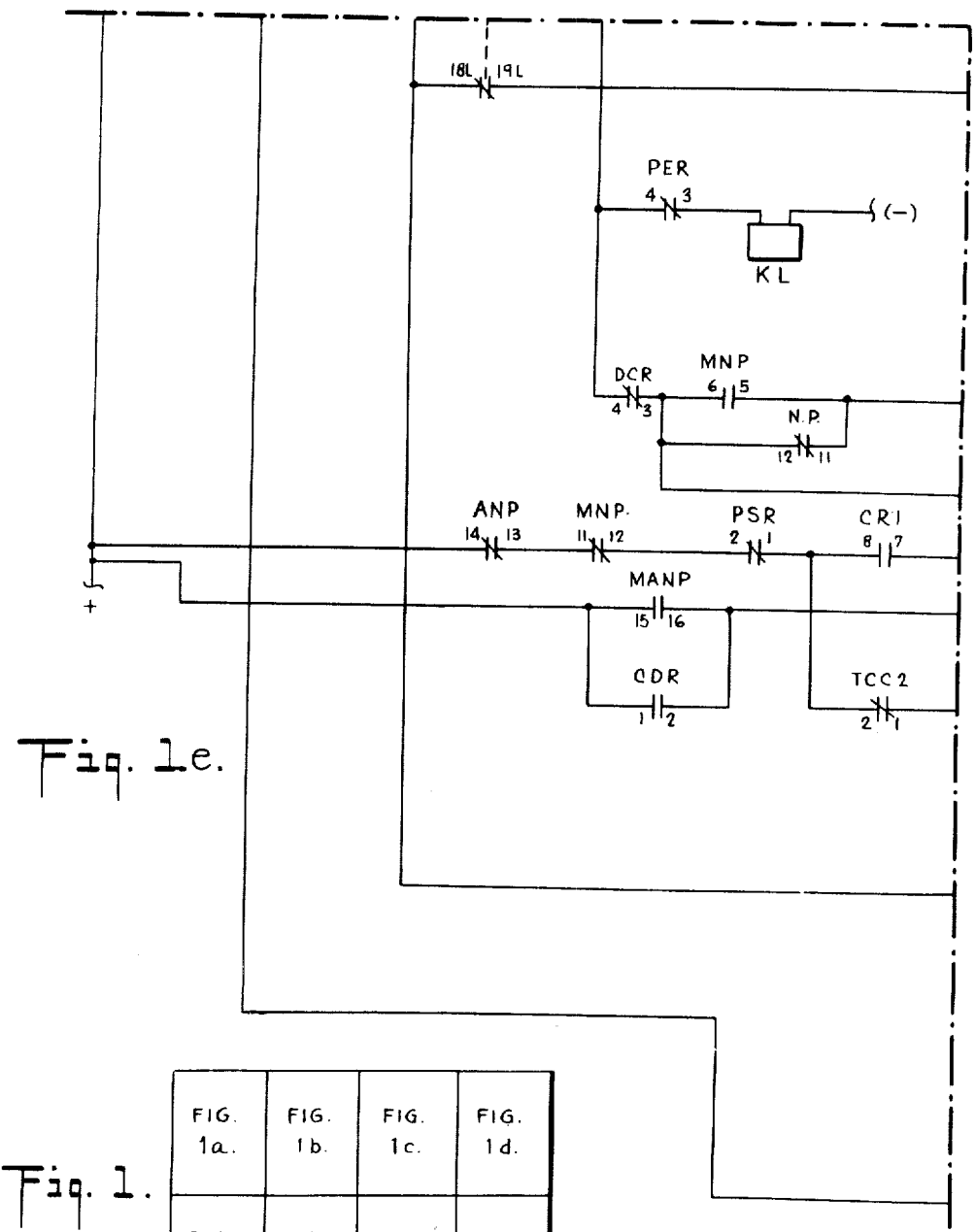

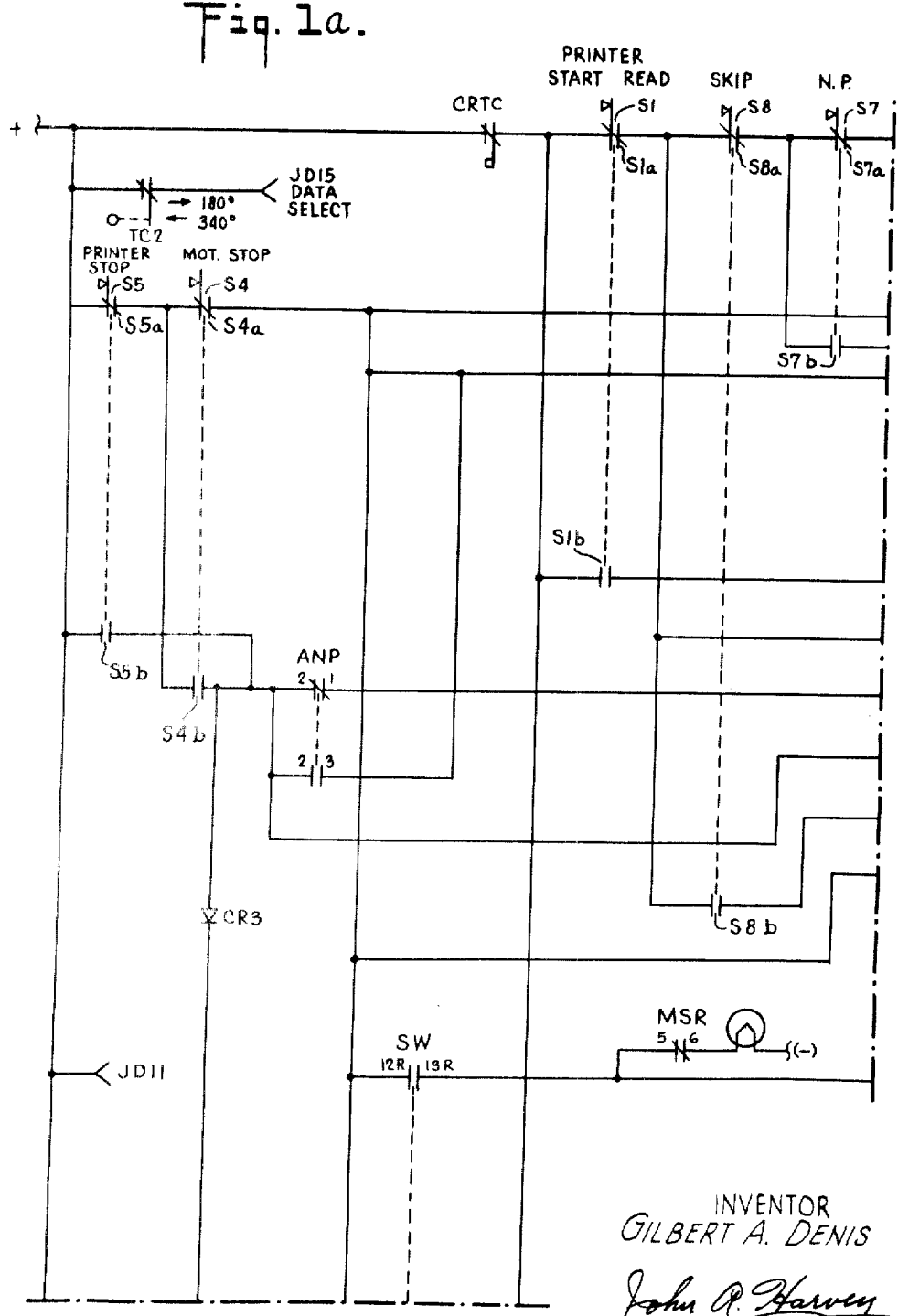

United States Patent Office

3,246,301
Patented Apr. 12, 1966

3,246,301
DATA TRANSLATION SYSTEM
Gilbert A. Denis, Rochester, N.Y., assignor, by mesne assignments, to Friden, Inc., San Leandro, Calif., a corporation of Delaware
Filed Jan. 30, 1961, Ser. No. 85,691
11 Claims. (Cl. 340—172.5)

The present invention relates to data translation systems and, particularly, to systems in which data to be processed may be selectively derived from one or more record media and selectively supplied to data translation devices for utilization. While the invention has wide utility, it has particular utility in connection with data printers utilizing punched-tape or punched tabulating card record media and will be described in that connection.

Punched-tape and punched tabulating cards have been widely accepted in integrated data processing systems for automatic operation of document and data originating machines. A tape-controlled printing machine of this nature is the subject of U.S. Patent No. 2,700,446, granted January 25, 1955, to Edwin O. Blodgett, and an improved tape or edge-punched tabulating card controlled printing machine is disclosed in the Edwin O. Blodgett et al. U.S. Patent No. 2,905,298 granted September 22, 1959. The printing machine disclosed in the patent last mentioned utilizes automatic program control to facilitate, with minimized manual keyboarding, the preparation at high speed and with extreme accuracy of documents and accompanying by product punched-tape record media for use in further integrated data processing.

A very flexible system permitting program controlled automatic printing and selective recording or rerecording of repetitive or invariable data interspersed with manual printing of variable data and the printing of data selected automatically from either of two record media, including automatic search of one record medium for address identified data, is disclosed in the copending application of Edwin O. Blodgett et al., Serial No. 845,989, filed October 12, 1959, and assigned to the same assignee as the present application. This Blodgett et al. system is characterized by two modes of operation dependent upon the manual setting of a control switch to a so-called duplex position or to a co-called synchronous position. In the duplex position of the control switch, either or both of two record media may supply data and also provide program control of all printing operations and the two media may be alternately selected under program control of each by the other. Also one record medium reader may be caused under manual or program control to make an automatic search at high reading rate for data having an address supplied manually or by the other record medium, and an automatic search of the one record medium may when once initiated be automatically continued to collate all data in the record medium having the selected address. In the synchronous mode of the system operation, one record medium supplies data for printing, controls all programmed operations, and under program control selects successive individual alphanumeric data characters from the other record medium for use in printing of data or for rerecording such data in a new record medium.

It would be desirable to enhance the flexibility of the system last mentioned to an even greater extent by permitting programmed control by at least one record medium of the selective operation of the system in its duplex and synchronous modes. This would dispense with the need for operator attention or knowledge concerning which mode of system operation might or should be selected from time to time in printing any of numerous types of business forms and documents, thus permitting at least one record medium to provide extreme flexibility of programmed control of all printing and recording operations and leaving the operator free to exercise mere supervision of the operations and effect manual printing of variable data from time to time as desired.

It is an object of the present invention to provide a new and improved data translation system characterized by unusual flexibility in the manual or programmed selection and selective change of various modes and types of system operation.

It is a further object of the invention to provide a novel data translation system in which any of plural record media may supply data for translation and program control over the translation operations and at least one such record medium may additionally control and select alternative and fundamentally different modes of system operation.

Figure 1C:
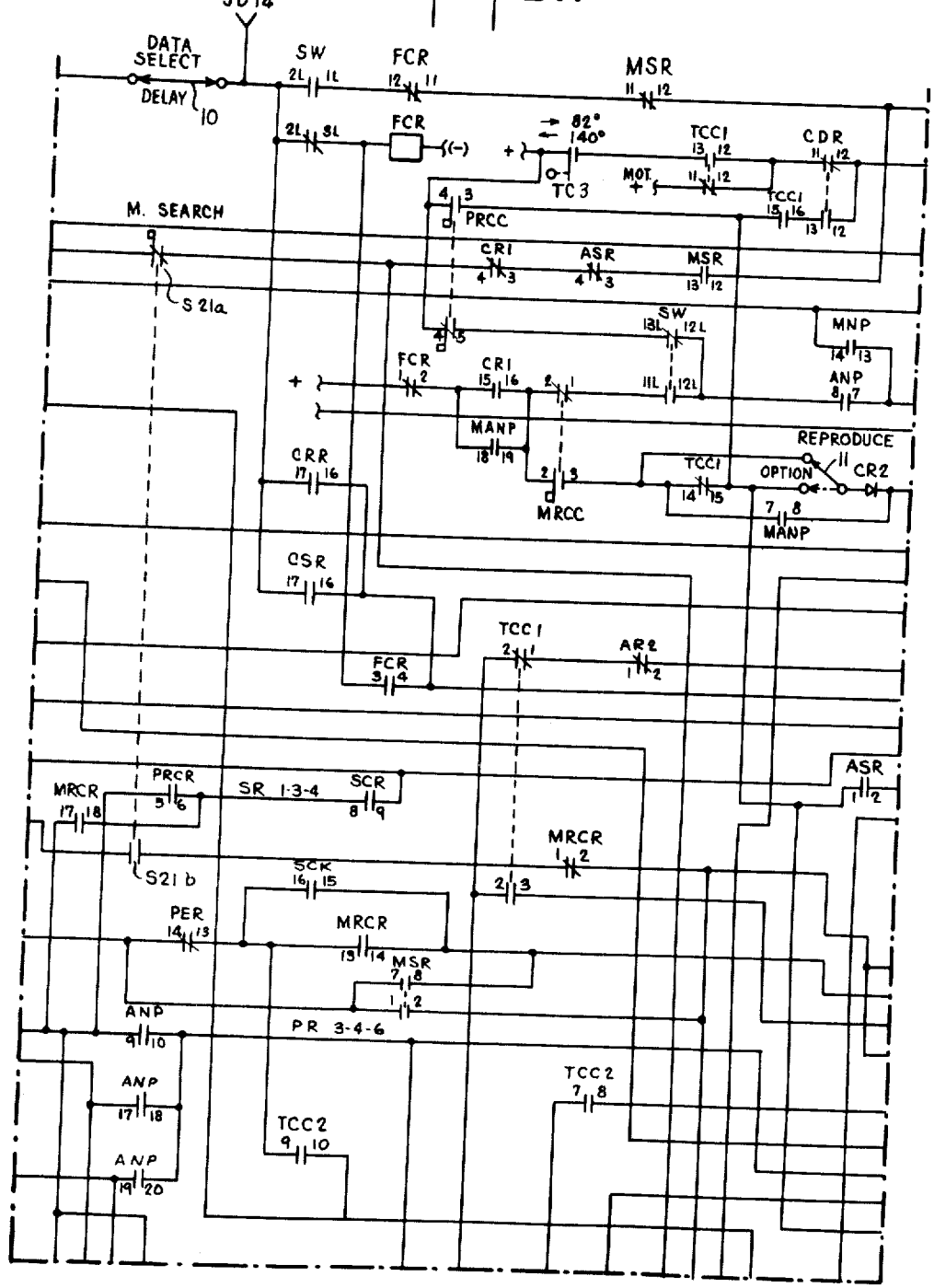
Figure 1D:
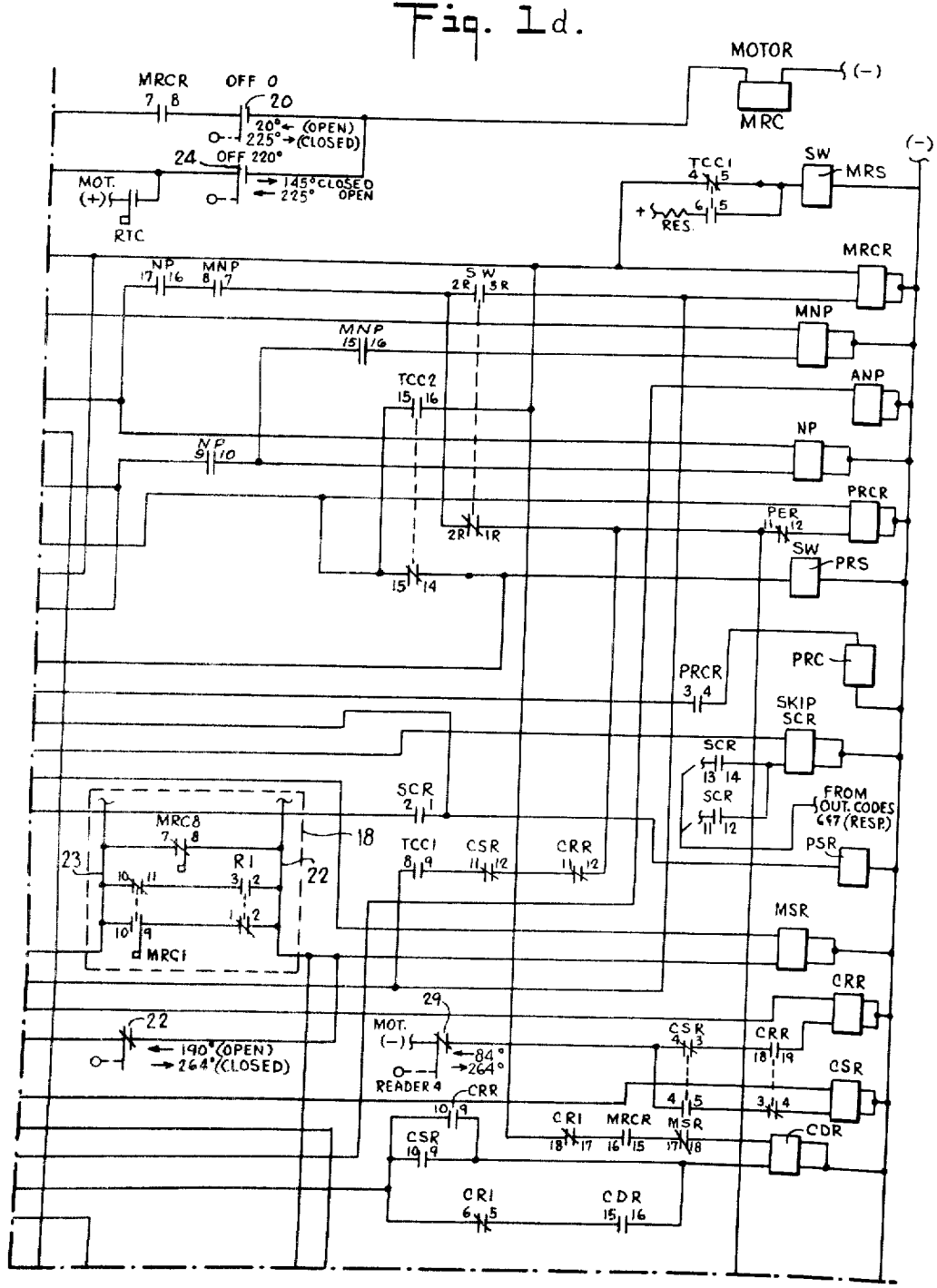
Figure 1F:
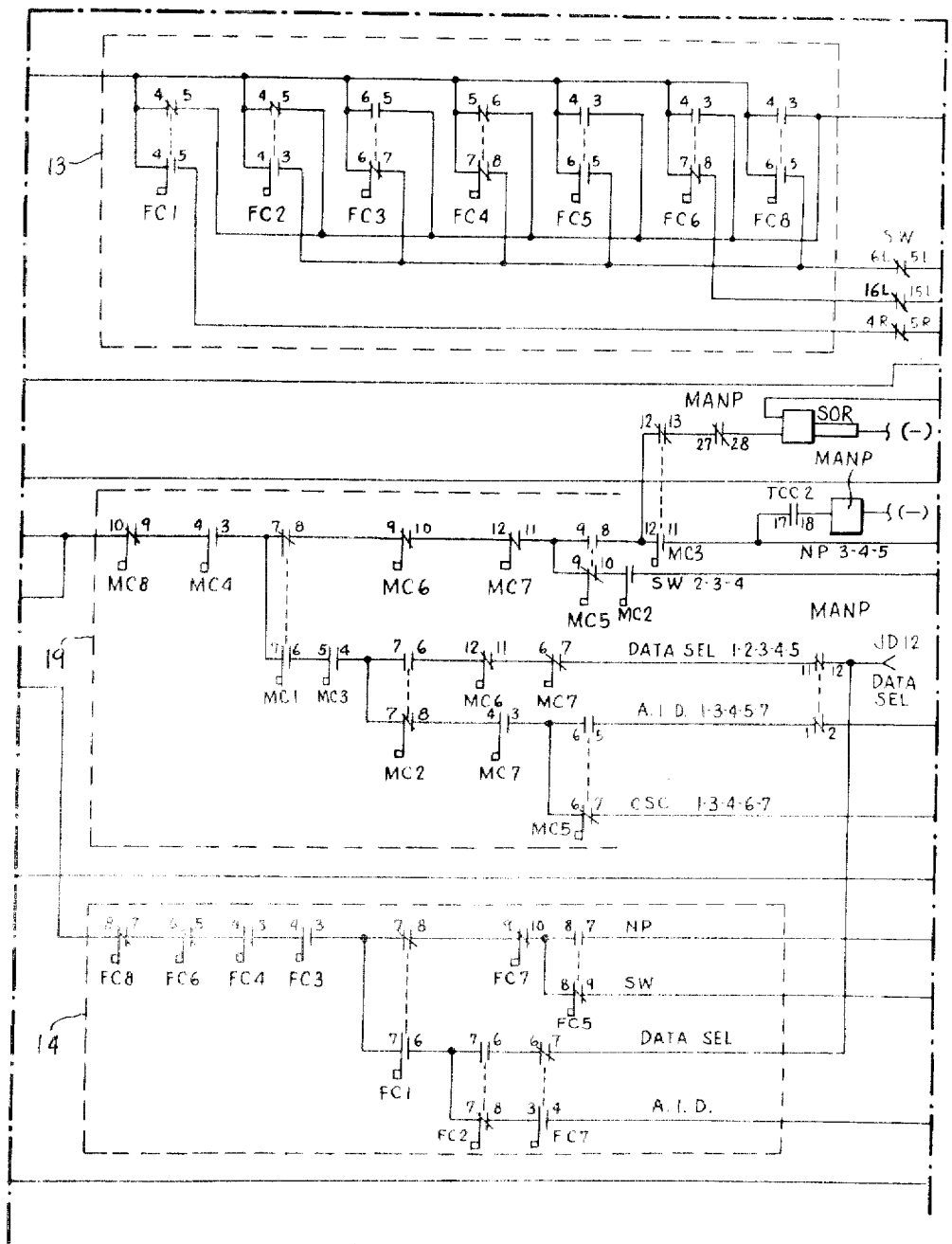
Figure 19:
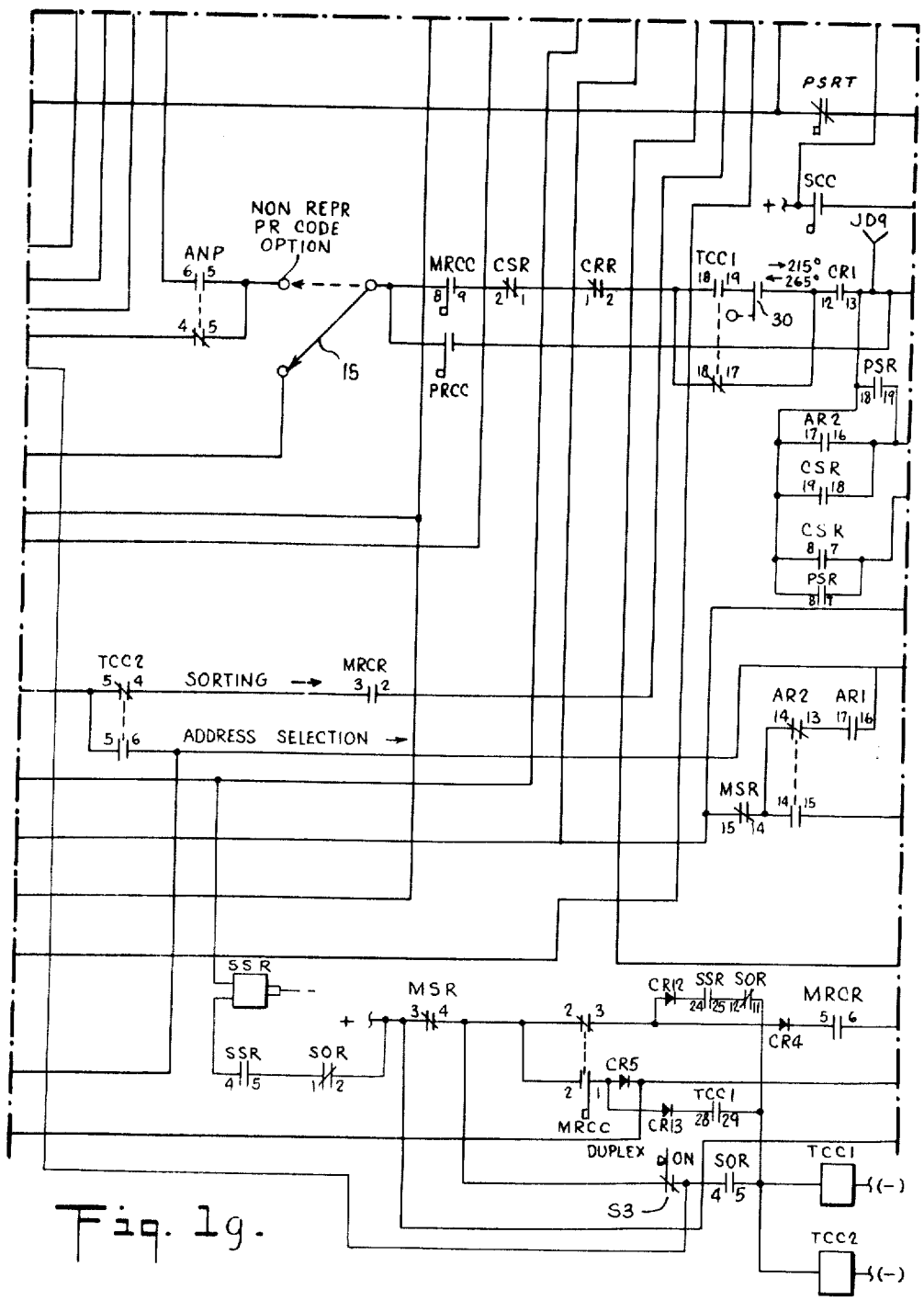
Figure 1H:
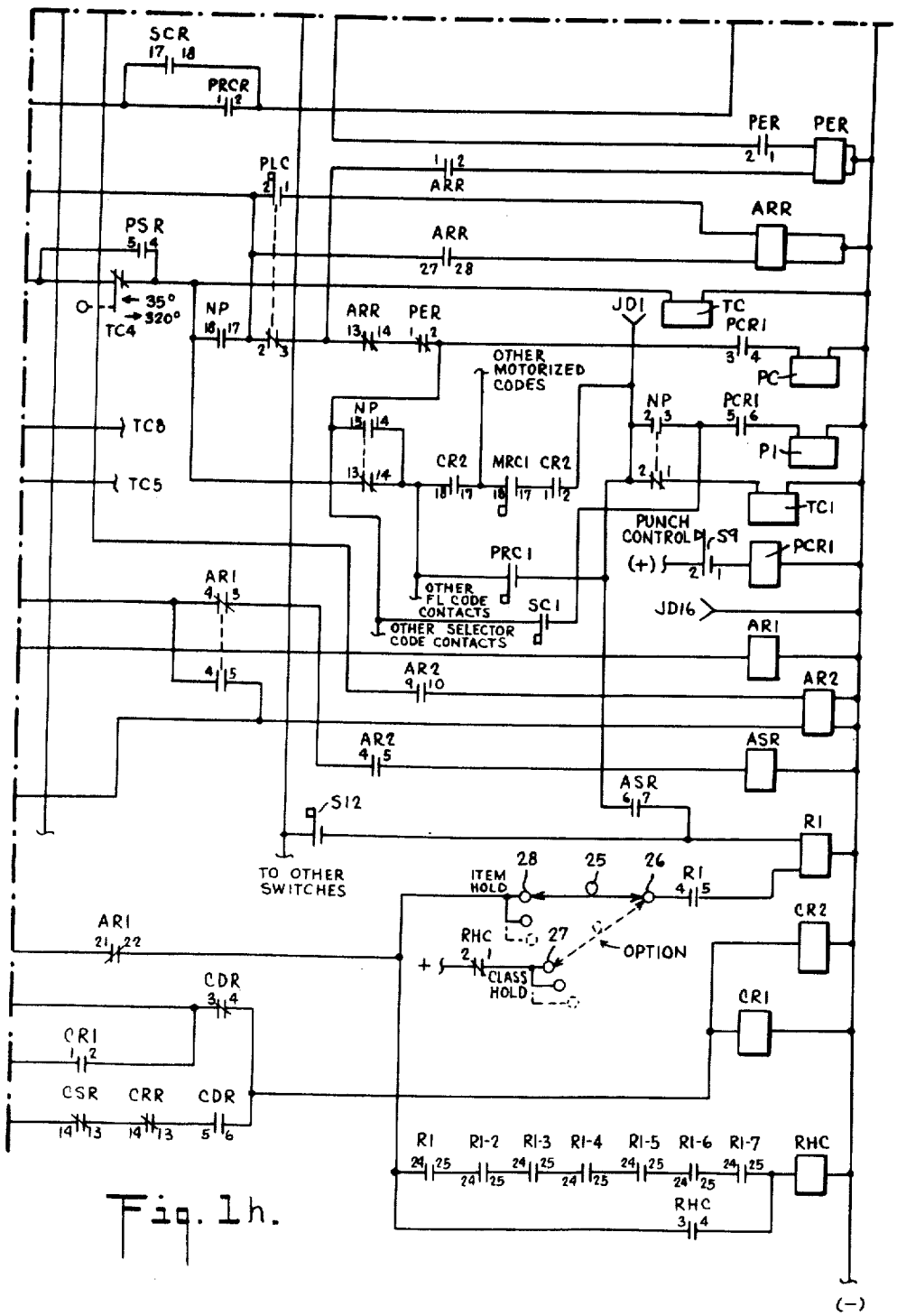

Other objects and advantages of the invention will appear as the detailed description thereof proceeds in the light of the drawings forming a part of this application and in which FIGS. 1a–1h, arranged as indicated in FIG. 1, represent the components employed in and the electrical control system of a data translation system embodying the invention.

GENERAL ORGANIZATION AND OPERATION

The data translation system herein described utilizes a punched-tape or punched tabulating card controlled printer and punched-tape recorder of the type shown in the aforementioned Blodgett et al. patent to which reference is made for an understanding of the general mechanical construction and operation of the printer and its associated punched-tape or card reader and byproduct tape punch. The punched-tape or punched tabulating card reader shown as used with the printer in Patent No. 2,-905,298 may, if desired, be replaced by a similar punched tabulating card reader having the construction disclosed in the Edwin O. Blodgett application Serial No. 845,782, filed October 12, 1959, entitled Tabulating Card Reader, and assigned to the same assignee as the present application. As explained in the patent last mentioned, data and functional control information is recorded by combinational arrangements of code bits positioned in successive groups each identifying an alphanumeric character, a symbol, or a function to be performed. Tabulating cards conventionally employ a twelve-bit code widely referred to as the Hollerith code, while the punched-tape employed in a punched-tape reader of the present system uses a maximum of eight code bits and thus is said to convey eight channels of information. The punched tabulating card reader and punched-tape reader have card or tape feed arrangements for moving the card or tape code-bit-group by code-bit-group through the reader, and each code group is read by aligned reading pins of which there is one pin for each code level used. Those reading pins which project through apertures of the card or tape during a reading operation complete electrical circuits which may be used either to actuate a code translator structure in the printer, and thereby effect power driven key lever and functional control actuations of the printer, or to energize punch magnets of a punch structure to effect repunching of the information into a byproduct tape. Key lever and functional control operations of the printer also energize coded combinations of electrical output circuits which may control the punch to record in the byproduct tape selected portions or all of the information necessary to duplicate the printed copy and its format.

The system as herein described has two important modes of system operation and either mode may be selected at will and automatically under program control. These are designated the nonsynchronous mode, characterized by extreme flexibility of information supply by either the motorized or printer readers under program control of either reader, and the synchronous mode characterized by program control by the motor reader over the printer reader which in this instance will ordinarily be of the tabulating card type using the Hollerith code but may be of the punched-tape type such as shown in either of the aforementioned patents.

The data translation system herein described includes, as just mentioned, a punched-tape reader which may be included in a self-motorized unit cable connected to the printer structure and having the general construction of that disclosed in the United States patent to Edwin O. Blodgett et al., No. 2,927,158.

The arrangement herein described may also include, constructed integrally with the printer or reader last mentioned or even as a separate auxiliary unit, a manual data selector by which numeric information up to a maximum of ten digits and one or more symbols may be manually selected for programmed use. This manual data selector includes ten switches which may each be manually set to any numeric value from zero through nine and which when so set generate, upon data read out, coded numeric data which controls the printer numeric and symbol keylevers in the same manner as coded numeric data and symbols read from a punched tape or a tabulating card. Read out of the manual data selector is accomplished by energizing a stepping switch therein, which operates through a stepping cycle successively to energize the ten manually settable switches and thereby supply to the printer in succession the ten numeric data digits or symbols to which the ten switches have been set. A manual data selector of this type is disclosed in the Edwin O. Blodgett application Serial No. 802,331, filed March 27, 1958, now Patent No. 3,025,941, entitled Selective Data Translating System, and assigned to the same assignee as the present application.

In the nonsynchronous mode of system operation, either the motorized or printer reader has the ability under manual or programmed control to skip over recorded information until the skipping is terminated under program control or manually. The system also has the ability to effect nonprinting of information read from either reader. This latter operation is subject to initiation either manually or under program control; it is terminated manually or by reading a stop code if manually initiated, or otherwise may be manually halted (but not manually terminated) and is eventually terminated only by reading a programmed print restore code. The information read but not printed during a non-print operation may be recorded in a byproduct tape so that any information read by either of the readers but not printed may be recorded in whole or in part in the byproduct tape by selective control of the byproduct tape punch.

For convenience of description, the punched-tape or tabulating card reader which forms a component of the printer as in the aforementioned Blodgett et al. Patent No. 2,905,298 or Blodgett application will be hereinafter referred to as the printer reader whereas the second punched-tape reader will be referred to for convenience as the motorized reader. It will be understood that this designation is used simply for convenience of description, and does not imply that the second tape reader is necessarily a separate and distinct motorized unit as distinguished from a construction wherein it also is a component of the printer.

The punched-tape used in the system herein described utilizes an 8-level punch code which may be similar to that used in the aforementioned Blodgett et al. Patent No. 2,905,298 insofar as normal alpha-numeric characters, symbols, and functional control information are concerned. The eighth level of the code is particularly used, however, to identify any of the 127 different address or classification codes used at the beginning of each item or block of information search performed by the motorized reader during operation of the system. The address codes thus differ from normal information codes by always including a code bit in the eighth channel. For the nonsynchronous mode of system operation, each item or block of information thus identified by an address may be terminated by an address identification code, a switch code, or a stop code depending upon the operational programming desired. The functions of the several codes last mentioned will shortly be explained. The punched tape used with the data translation system herein described, and having data addresses identified by an 8-level code bit, can be prepared as a byproduct tape of the printer either by manual key lever operation or by suitable programmed control of the printer by a program tape read by the printer reader. The motorized reader includes seven manual switches which can be operated in various combinations to select any one of the 127 different address codes available, or any one of these addresses may be specified by an address code recorded in the tape or card of the printer reader. The address of information for which a search is to be made in the motorized reader tape thus can be supplied either by the manual setting of these seven switches, or by an address supplied from the tape or card of the printer reader, or supplied in part by the latter with the balance of the address being supplied by the motorized reader.

Whenever an address identified information item or block of information is desired from the punched tape of the motorized reader, the operation of the latter is controlled to initiate a search at a high reading rate until the information is found. This search may be initiated manually, in which event the identifying address is normally established by manual operation of the seven address selection switches earlier mentioned, or may be initiated automatically under control of a search command read by the printer reader in the non-synchronous mode of system operation or read by the motorized reader in the synchronous mode. If the search is initiated by the printer reader, an address identification code (referred to herein as an AID code) is first read and this is followed by the address of the information sought; the address thus provided by the printer reader is stored in the motorized reader which immediately begins the search and continues it until the addressed information is located. While this search is in progress, the printer reader continues normal operation until it reads a switch code which thereupon halts the printer reader and transfers control of all subsequent operations to the motorized reader. If the latter has located the addressed information and has halted awaiting the switch code, it responds to the latter and proceeds to read the addressed information to the printer for reproduction or to a tape punch for recording of the information should the operation at that time be of the nonprint character. If the addressed information has not been located at the time the switch code is read by the printer reader, the latter nevertheless halts its operation and the motorized reader continues its search and immediately reads the addressed information as soon as it is located. If the printer reader is of the tabulating card type using the Hollerith code, the synchronous mode of system operation is ordinarily used and a search is again initiated by the printer reader but in this case under control of the motorized reader. The motorized reader in this instance immediately calls for a search address from the card reader, and readout from both readers halts until the search is completed at high reading rate by the motorized reader after which the information located by the search is read out to the printer or tape punch at lower reading rate.

For the nonsynchronous mode of operation, information read out after search location may be terminated by a further search command and in this event the motorized reader immediately initiates a new search for information having the same address as that last sought and reads the addressed information out as soon as it is located. If the addressed information in the nonsynchronous operational mode is terminated by a stop code, the motorized reader operation halts to permit a further manual operation. This may include a new address selection effected by manual setting of the seven address switches earlier mentioned, or may include one or more manual printing or other desired manual operations. Resumed operation by use of either reader is then available and is effected manually. If the addressed information readout by the motorized reader is terminated by a switch code in the nonsynchronous operational mode, this code causes immediate halt of operation of the motorized reader and initiates further operation of the printer reader.

This alternate transfer of reader operation between the printer reader and the motorized reader during the nonsynchronous operational mode is hereinafter referred to for convenience as duplex operation, and is effected only upon manual setting of a duplex switch provided for this purpose. Where in the nonsynchronous operational mode the record medium read by the printer reader does not itself record address identity information but merely utilizes a switch code, it is possible manually to select an address by means of the seven address selection switches and thereafter manually to actuate the motorized reader search switch to effect a single search operation all of which may be accomplished while the printer reader is continuing through a period of its operation. Now the subsequent reading of a switch code by the printer reader simply effects readout by the motorized reader of the information located by this manual operational procedure.

While the duplex switch previously mentioned is manually actuated to its duplex position, the system operation may be program selected at any time to be of the synchronous type and the operations of each reader are generally as described except that a switch code read during operation of the motorized reader causes one item of information to be read by the printer reader and a skip code read by the motorized reader causes one item of information to be read by the printer reader but not utilized. This type of operation is particularly useful where the printer reader is of the type for reading a tabulating card using the Hollerith code, and enables the tabulating card to be read column-by-column under program control of the motorized reader. Manual actuation of the duplex switch to nonduplex position causes the system operation to remain in the synchronous mode once that mode is automatically selected.

The motorized reader performs its searching operation at a much higher reading rate than is permissible when information is to be read out to the printer or byproduct tape punch. Upon completion of each search and the initiation of an information readout operation, the reading rate of the motorized tape reader is automatically reduced to the highest rate at which the information can be utilized by the printer or byproduct tape punch. This control of the motorized reader reading rate thus minimizes the required search time while permitting the system operation at the maximum rate at which the printer or byproduct tape punch can receive and utilize the information without operational error.

The electrical circuit arrangement of the data translation system of the present invention is shown in FIGS. 1a–1h, which should be considered together arranged as shown in FIG. 1.

(1) *Duplex (nonsynchronous) operation under control of the printer reader*

The system includes a manually actuable printer reader start read switch S1 which, upon actuation, opens a pair of contacts S1a and closes a pair of contacts S1b to energize a reader control relay PRCR through a circuit which includes the normally closed contacts CRTC of the printer. The latter contacts are opened and remain open during each carriage return or tabulation operation of the printer. A switch unlatched magnet PRS of a switch relay SW is energized concurrently with the relay PRCR through normally closed contacts 14 and 15 of a relay TCC2. The unlatched magnet PRS operates in association with a magnet MRS of the switch relay SW. Upon energization of the magnet MRS, the switch relay SW moves its contacts to (and mechanically latches them in) one position enabling operation of the motorized reader. Subsequent energization of the unlatched magnet PRS serves to unlatch the contacts of the switch relay SW and position them to enable generalized selection of the printer reader for operation. FIG. 1 shows the switch relay contacts in the last mentioned (unlatched) position.

The relay PRCR having been thus energized is thereafter maintained energized through a hold circuit which includes the relay contacts 11 and 12 of a punch error relay PER, the relay contacts PRCR 1–2 now closed, the printer reader contacts PSRT which are closed when a tape or card is in the printer reader in readiness to be read, normally closed stop code 1–2–4 reader contacts of the printer reader contact bank 13, the now closed contacts 18L and 19L of the switch relay SW, the normally closed contacts S4a of a motorized reader stop switch S4, and the normally closed contacts S5a of a printer reader stop switch S5.

When the start read switch S1 is manually released and returns by spring bias to the position in which its contacts S1a are closed and its contacts S1b open, a relay FCR is energized through a circuit which includes the now closed contacts 2L and 3L of the switch relay SW, a conductive link 10 connecting circuit terminals JD13 and JD14, normally closed contacts 11 and 12 of a relay TCC2, the cam-actuated contacts TC1 of the printer which are closed each time the printer completes a cycle of its operation, the normally closed contacts 13 and 14 of a delay control relay DCR provided in the printer for purposes presently to be described, the normally closed contacts STDC provided in the printer and actuated by any of several keylevers affecting printer functions requiring a temporary halt in the printer reader operation, the normally closed contacts S6a of a motorized reader start read switch S6, the normally closed contacts S7a of a manual nonprint switch S7, the normally closed contacts S8a of a manual skip switch S8, the normally closed contacts S1a of the start read switch S1, and the normally closed contacts CRTC earlier mentioned. The contacts 5 and 6 of the relay FCR now close to remove the printer cam-actuated contacts TC1 from the energizing circuit last traced.

The printer reader is now placed in operation by energization of its reader clutch magnet PRC through a circuit which includes the now closed contacts 3 and 4 of the relay PRCR, and the now closed contacts 3 and 4 of the relay FCR to the energizing circuit of the relay FCR last traced. The reader operation normally continues until its reader contact bank 13 reads a stop code 1–2–4 or either of the stop switches S4 or S5 is manually actuated, either of which interrupts the hold circuit earlier described of the reader control relay PRCR, thereupon deenergizing this relay and causing its contacts 3 and 4 to interrupt the energizing circuit of the reader clutch magnet PRC. Thus it will be seen that the printer reader once placed in operation will continue reading its tape until it reads a stop code 1–2–4 or a stop switch is manually actuated.

While the reader thus operates, it supplies the information read from its tape or card to the printer or to the byproduct tape punch as explained more fully in the aforementioned Blodgett patents. In here briefly reviewing this operational phase of the system, only those components of the first-code-level are shown for simplicity. It will be understood, however, that similar components are provided for code levels 2 through 8 as more fully disclosed in the Blodgett et al. Patent No. 2,905,298. The printer reader includes plural code reading contacts of which for simplicity, as just noted, only the first level contacts PRC1 of the first level contact assembly (additional contacts of the first through eighth level contact assemblies are shown in the reader contact banks 13 and 14) are shown in FIG. 1g. When these close by reading a one level code bit, they energize a printer code translator magnet TC1 through a circuit which includes normally closed contacts 1 and 2 of a non-print relay NP, the normally closed contacts 13 and 14 of the nonprint relay NP, the cam-actuated contacts TC4 which are closed at 320° of one printer cycle and open at 35° of the next printer cycle, normally open reader common contacts PRCC which close at approximately 80° of the reader cycle while the reader pins are in reading position, and a switch 15 which in one position completes the energizing circuit here considered through the normally closed contacts 3 and 4 of the delay control relay DCR to the normally closed carriage return contact CRTC or which in the other position of the switch 15 completes the energizing circuit through normally closed contacts 4 and 5 of an automatic nonprint relay ANP and the normally closed contacts 11 and 12 of the nonprint relay NP to the normally closed contacts 3 and 4 of the delay control relay DCR. The function of the switch 15 in completing the alternate energizing circuits last described will be explained hereinafter in connection with the automatic nonprint operation. The translator clutch magnet TC is energized directly by the printer cam-actuated contacts TC4 of the energizing circuit last described, and this energization of the translator clutch and translator magnets (TC1 and other translator magnets, not shown, in accordance with the information code read) effects automatic key-lever actuations of the printer in reproducing printed copy.

If it should be desired that a portion or all of the information printed be recorded in a byproduct tape, a punch control relay PCR1 is energized by manual actuation of a punch control switch S9 (FIG. 1g) to close its contacts 1 and 2. The relay PCR1 when energized closes its contacts 3 and 4 by which to energize the punch clutch magnet PC through the normally closed contacts 1 and 2 of a punch error relay PER, the normally closed contacts 13 and 14 of an antirepeat relay ARR, the normally closed contacts 2 and 3 of a punch latch contact PLC (which transfers its contacts 1–3 throughout the major portion of a punch cycle), and the code selector common contacts SCC which close during each printer cycle of operation. The relay PCR1 also closes its contacts 5 and 6 by which to energize a first-code-level punch magnet P1 (the higher level punch magnets and corresponding contacts of the relay PCR1 being omitted for simplicity as previously explained) through the printer code selector contacts SC1 (other such selector contacts being provided for the higher level punch magnets) actuated in conformity with the particular functional operation performed by the printer. The punch structure and its complete mode of operation are described in the aforementioned Blodgett et al. Patent No. 2,905,298, and it may here merely be added in connection with the antirepeat relay ARR that contacts 1 and 2 of a punch latch contact PLC and the code selector common contact SCC together energize the antirepeat relay ARR in the event that the keylever actuations of the printer should occur at a rate (by manual keylever operation) higher than the cyclic periodicity of the punch. Should this occur, the contacts 27 and 28 of the relay ARR close to maintain the latter energized through the contacts SCC alone, and the contacts 1 and 2 of the relay ARR energize the punch error relay PER if the relay ARR is yet energized when the contacts 2 and 3 of the punch contact PLC again close. The relay PER if energized holds through its contacts 1 and 2 and the start read switch S1. The contacts 11 and 12 of the punch error relay PER interrupt the hold circuit of the printer read control relay PRCR to deenergize this relay and require that the printer reader be manually restarted by actuation of the start read switch S1 to interrupt the hold circuit of the relay PER and reenergize the reader control relay PRCR as described above. The normally closed contacts 3 and 4 of the punch error relay PER are opened by energization of the latter, and when so opened lock up the key levers of the printer against actuation by deenergization of the key-lock magnet KL (FIG. 1e).

The printer herein described, as in the aforementioned Blodgett et al. Patent No. 2,905,298, may be manually and program controlled to effect nonprinting of information read from either the printer reader or the motorized reader. The information not so printed may, however, be recorded in a byproduct tape by manual control of the byproduct tape punch as last described. Manual nonprint control is effected by manually actuating the nonprint switch S7 to open its contacts S7a and close its contacts S7b. Opening of the contacts S7a interrupts the energizing circuit of the reader clutch magnet PRC to halt the operation of the printer reader, and closure of the nonprint switch contacts S1b energizes a manual nonprint relay MNP through a circuit which includes normally closed contacts 21 and 22 of an automatic nonprint relay ANP and the normally closed contacts 21 and 22 of a skip relay SR. The manual nonprint relay MNP closes its contacts 13 and 14 to pick up a nonprint relay NP while the nonprint switch S7 is still actuated to close its contacts S7b. The now closed contacts 16 and 17 of the relay NP and the new closed contacts 7 and 8 of the relay MNP energize either the read control relay PRCR through the contacts 1R and 2R of the switch relay SW or a motorized reader read control relay MRCR through the contacts 2R and 3R of the switch relay SW depending upon which reader was last operating. These relays remain energized through the now closed contacts 13 and 14 of the relay MNP, the now closed contacts 16 and 17 of the relay NP, the now closed contacts 7 and 8 of the relay MNP and either the contacts 1R and 2R of the switch relay SW to the hold circuit of the relay PRCR or the contacts 2R and 3R of the switch relay SW to the hold circuit of the motorized reader control relay MRCR depending upon whether the printer reader or motorized reader is reading at this time. An auxiliary hold circuit for the relays MNP and NP includes the contacts 15 and 16 of the relay MNP, the contacts 9 and 10 of the relay NP, a diode rectifier CR2, and an option switch 11 either directly or through normally closed contacts 14 and 15 of a relay TCC1 to the printer reader common contacts PRCC 3, 4, whereby these relays shall always remain energized until the end of a reader cycle.

While the nonprint relay NP remains energized, its contacts 1 and 2 open and its contacts 2 and 3 close to remove the translator magnet TC1 from the reader contacts PRC1 and connect the latter to the punch magnet P1 if the punch control relay PCR1 is energized at this time to close its contacts 5 and 6 (other contacts not shown of the relay NP effect like transfer between the reader contacts and the translator and punch magnets as more fully disclosed in the afornentioned Blodgett et al. Patent No. 2,905,298). At the same time, the energizing circuit of the reader contacts PRC1 is modified by transfer of the contacts 13, 14 and 14, 15 of the nonprint relay NP so as to include contacts 1 and 2 of the punch error relay PER, contacts 13 and 14 of the antirepeat relay ARR, the normally closed contacts 2 and 3 of the punch latch contact PLC, and the now closed contacts 17, 18 of the nonprint relay NP so that the energization of the punch clutch magnet PC and reader contacts PRC1 are controlled each reader cycle by operation of the printer reader common contacts PRCC. The energizing circuit here considered is completed for one position of the switch 15 directly to the contacts 3 and 4 of the delay control relay DCR, and is completed in the other position of the switch 15 through the normally closed contacts 4 and 5 of the automatic nonprint relay ANP and the now closed contacts 5 and 6 of the manual nonprint relay MNP to the contacts 3 and 4 of the delay control relay RDC. Actually the alternate positioning of the switch 15 has relation only to the automatic nonprint operation as will presently be explained.

Now as soon as the nonprint switch S7 is manually released and again closes its contacts S7a, the energizing circuit of the reader clutch magnet PRC is reestablished and the printer reader resumes operation. As mentioned above, the reader will continue operation until such time as the reader contact bank 13 reads a 1–2–4 stop code or the printer stop switch S5 is manually actuated.

The automatic nonprint operation is similar to that just described except that it is initiated when the printer reader reads an automatic nonprint code 3–4–5. When this occurs, the reader contacts bank 14 energizes an automatic nonprint relay ANP and the contacts 9 and 10, 17 and 18, and 19 and 20 of the latter close to complete a hold circuit for this relay through the contacts 5L and 6L, 15L and 16L, and 4R and 5R of the switch relay SW and the normally closed print restore code 3–4–6 contacts of the printer reader contact bank 13. Note in this respect that the reader contact bank 14 is unable to energize the automatic nonprint relay ANP as last mentioned during a manual nonprint operation since the energizing circuit of these contacts is interrupted by the contacts 11 and 12 of the manual nonprint relay MNP. The contacts 13 and 14 of the automatic nonprint relay ANP deenergize the reader contact bank 14 to cause the reader to ignore several operational codes read during an automatic (and manual) nonprint operation. The nonprint relay NP is thereupon energized through the contacts 7 and 8 of the automatic nonprint relay ANP, the now closed contact 12L and 13L of the switch relay SW, and the reader contacts 4 and 5 of the printer reader common contact PRCC when the latter close at the completion of the reader cycle during which the automatic nonprint code 3–4–5 was read. The nonprint relay NP is held through its now closed contacts 9 and 10 and the contacts 3 and 4 of the reader common contacts PRCC during a reader cycle and continues to remain energized at the end of the reader cycle in the manner last explained, it being noted that the contacts 3 and 4 of the reader common contacts PRCC and its contacts 4 and 5 both make before break during the reader cycle. The functions performed by the nonprint relay NP are those just described with respect to the manual non-print operation and will not be repeated. There are, however, one or two differences, aside from the manner of terminating the operations, between the automatic nonprint and manual nonprint operations which will now be considered.

It was previously explained that the hold circuit of the reader control relay PRCR extended through the stop code contacts of the reader contact bank 13; in the automatic nonprint operation the latter stop code contacts are no longer included in the hold circuit of the relay PRCR which now extends through the now closed contacts 8L–9L of the switch relay SW, the now closed contacts 15 and 16 of the automatic nonprint relay ANP, and the normally closed contacts of the stop switches S4 and S5. Thus a stop code 1–2–4 read by the printer reader is no longer effective to terminate an automatic nonprint operation, which can be terminated only by reading a print restore code 3–4–6 by the bank of reader contacts 13 to interrupt the hold circuit for the relay ANP. Also whereas the manual nonprint operation can be terminated by manual actuation of the printer stop switch S5, in the automatic nonprint operation actuation of the switch S5 to close its contacts S5b now establishes an alternate holding circiut for the reader control relay PRCR to prevent termination of the automatic nonprint operation by actuation of the switch S5. This holding circuit may be traced from the contacts S5b of the printer stop switch S5 and through the now closed contacts 2 and 3 of the automatic nonprint relay ANP to the hold circuit last mentioned. During an automatic nonprint operation, operation of the manual nonprint switch is ineffective to energize the manual nonprint relay MNP since this energizing circuit is interrupted at the normally closed contacts 21 and 22 of the automatic nonprint relay ANP.

The significant purpose of the switch 15 earlier mentioned has relation to the recording or nonrecording in the byproduct tape of the print restore code. With the switch 15 positioned to complete the energizing circuit of the punch clutch magnet and punch magnets only through the contacts 3 and 4 of the delay control relay RDC, a print restore code 3–4–6 is not effective to interrupt this energizing circuit and the print restore code read by the reader is thus recorded in the byproduct tape. Transfer of the switch 15 to complete the energizing circuit for the punch through the now closed contacts 5 and 6 of the automatic nonprint relay ANP and the reader contact bank 13 causes this energizing circuit to become deenergized upon reading a print restore code and the latter is accordingly not recorded in the byproduct tape.

A skip operation may also be initiated manually and is terminated either by reading a skip restore code 1–3–4 or by manual actuation of the stop read switch S4 or S5. A manual skip operation is initiated by actuation of the skip switch S8 to close its contacts S8b and to open its contacts S8a. The latter interrupt the energizing circuit of the printer reader clutch magnet PRC, and the contacts S8b effect energization of a skip control relay SCR through normally closed contacts 1 and 2 of the manual nonprint relay MNP. The skip control relay SCR upon picking up establishes a hold circuit through its now closed contacts 8 and 9, the now closed contacts 5 and 6 of the reader control relay PRCR, and the skip restore code 1–3–4 contacts of the reader contact bank 13. Since the contact bank 13 interprets only five of eight possible code bits insofar as the skip restore code is concerned, two additional code bits if present are recognized by supplying the energizations from the sixth and seventh code level reader contacts (corresponding to PRC1) through the normally open contacts 11–12 and 13–14 to the relay SCR to maintain the latter energized should either a sixth or seventh level code bit be read by the reader. The now closed contacts 1 and 2 of the skip control relay SCR directly energize a reader skip relays PSR, but the latter may also hold through its now closed contacts 3 and 4 and the normally open contacts S4b or S5b of the stop switches S4 or S5 should either of the latter be manually actuated.

At the same time, the contacts 17 and 18 of the relay SCR energize the relay PRCR, and the contacts 19 and 20 of the skip control relay SCR establish a hold circuit for the read control relay PRCR around the stop code contacts of the reader contact bank 13 to insure that a skip operation shall not be terminated by reading a stop code. The now closed contacts 4 and 5 of the skip relay PSR bypass the printer cam actuated contacts TC4 to maintain the printer translator clutch TC continuously energized, and the now closed contacts 7–8 and 18–19 of the skip relay PSR maintain the translator magnets 5 and 8 continuously energized which has the effect on the translator operation that it prevents selection by the translator of any printer keylever including the carriage return keylever. While the skip operation is in progress, the contacts 1 and 2 of the skip relay PSR deenergize the reader contact bank 14 so that no new automatic type of printer operation may be effected by reading an operational code. Thus an automatic non-print code 3–4–5 if read at this time is ineffective to initiate an automatic nonprint operation.

Certain functions of the printer require a delay in the reader operation until the printer function is completed. Typical of these is the carriage return and tabulate operations. For these operations, printer contacts STDC are keylever actuated to energize a delay control relay DCR which thereupon maintains a hold circuit for itself through its contacts 1 and 2, the start read switch, the S6 nonprint switch S7, the skip switch S8, the start read switch S1, and the carriage return and tabulation contacts CRTC which open as soon as the carriage return or tabulation operation starts and remain open to its completion. Thus the delay control relay DCR is only briefly energized to perform certain functions to the required delay. The normally closed contacts 13 and 14 of the delay control relay DRC open upon energization of this relay to interrupt the energizing circuit of the printer reader clutch magnet PRC and halt the printer operation which does not resume until the contacts CRTC again close, and the normally closed contacts 3 and 4 of the reader delay control relay DCR open to deenergize the energizing circuit through the switch 15 of the printer code translator and byproduct tape punch until the delay control relay DCR is again deenergized when the carriage return and tabulating contacts CRTC open.

(2) *Duplex (nonsynchronous) operation under control of the motorized reader*

The system operation under control of the motorized reader is quite similar to that previously described for the printer reader.

The system includes a motorized reader start read switch S6 which is manually actuated to close its contacts S6b and place the reader in operation by energization of the motor read control relay MRCR while concurrently energizing the switch relay magnet MRS through the normally closed contacts 4 and 5 of the relay TCC1 to transfer the numerous contacts of the switch relay SW and reverse their open circuit and closed circuit positions as shown in the drawings. As previously noted, the switch relay SW when thus energized latches its contacts in their transferred position.

A hold circuit for the motorized reader control relay MRCR is established through its contacts 13 and 14, the normally closed contacts 13 and 14 of the punch error relay PER, the motor reader tight tape contacts MSTT (which are normally closed but open upon the tape becoming excessively tight for any reason during operation of this reader), the motor reader tape contacts MSRT which are closed when tape is positioned in the reader in readiness to be read, the stop-code 1–2–4 reader contacts of the motor reader contact bank 16, the now closed contacts 12R and 13R of the switch relay SW, and the normally closed contacts S4a of the motor stop switch S4 and the normally closed contacts S5a of the printer stop switch S5.

As soon as the read control relay MRCR is thus energized, its now closed contacts 15 and 16 energize a control delay relay CDR through a circuit which includes the normally closed contacts 17 and 18 of a relay CR1 and the normally closed contacts 17 and 18 of a motor search relay MSR. The relay CDR holds through its own now closed contacts 15 and 16, the normally closed contacts 5 and 6 of the relay CR1, and the normally closed contacts of the stop switches S4 and S5. The relays CR1 and CR2 are now energized by the now closed contacts 5 and 6 of the relay CDR, this energizing circuit including the normally closed contacts 13 and 14 of relays CRR and CSR. The relay CR1 upon becoming thus energized opens its contacts 5 and 6 and 17 and 18 to deenergize the delay control relay CDR, and both relays CR1 and CR2 now hold through a circuit which includes the contacts 3 and 4 of a motor search relay MSR and either the normally closed contacts 2 and 3 of the motor reader common contact MRCC, a diode rectifier CR4, and the now closed contacts 5 and 6 of the relay MRCR or the normally open contacts 1 and 2 of the reader common contact MRCC (which make before the MRCC contacts 2 and 3 break and vice versa), a diode rectifier CR5, the now closed contacts 1 and 2 of the relay CR1, and the normally closed contacts 3 and 4 of the control delay relay CDR.

Energization of the relays CR1 and CR2 now places the motor reader in operation by energization of its read clutch MRC through the cam actuated contacts 20 of the motor reader which close at 225° of one reader cycle and open at 20° of the next reader cycle and which are thus closed when the motor reader is quiescent, the now closed contacts 7 and 8 of the read control relay MRCR, the normally closed contacts 11 and 12 of the motor search relay MSR, the normally closed contacts 11 and 12 of the relay FCR (the latter being deenergized when the contacts 1L, 2L and 3L of the switch relay SW transferred), the now closed contacts 1L and 2L of the switch relay SW, normally closed contacts 11 and 12 of a relay TCC2, the normally closed cam-actuated contacts TC1 of the printer, the normally closed contacts 13 and 14 of the delay control relay DCR, and the normally closed contacts of the switches S6, S7, S8, S1 and contacts CRTC.

The motorized tape reader in being thus placed in operation reads successive data code groups and its reader contacts, of which only the first-code-level contact MRC1 is shown, energize corresponding ones of the printer translator magnets such as the first-level magnet TC1 or punch magnets such as the first-level magnet P1. It will be understood that, as in the case of the printer tape reader contacts PRC1, there are higher-level code-bit motor reader contacts not shown for simplicity, and that these energize higher level printer translator magnets and punch magnets also not shown for simplicity as previously explained. The energizing circuit for the motor reader contacts, as contacts MRC1, extends through the now closed contacts 1 and 2 of the relay CR2, the contacts 17 and 18 of the relay CR2 and the normally closed contacts 13 and 14 of the nonprint relay NP to the remainder of the energizing circuit as described with respect to the operation of the printer tape reader. Also in similar fashion to the latter, the contacts 8 and 9 of the motorized reader common contact MRCC effect energization of the motor reader contacts MRC1 and the translator clutch TC of the printer through the now closed contacts 1 and 2 of a code skip relay CSR, the contacts 1 and 2 of a code read relay CRR, the normally closed contacts 17 and 18 of the relay TCC1, the now closed contacts 12 and 13 of the relay CR1, and the printer cam-actuated contacts TC4. This energizing circuit and its general operation are similar to that previously described with respect to the printer tape reader.

Thus the motor reader clutch MRC upon being energized initiates a cycle of operation of the motor reader to read a data code group to the printer. This data may also be recorded by the byproduct tape punch, if such is desired, in the manner previously described. The motor reader having initiated the printer through a cycle of operation is, however, prevented from itself starting a new cycle of reader operation since the motor reader clutch MRC is deenergized by the opening of the printer cam-actuated contacts TC1 at the 15° point of the newly initiated printer cycle. The motor reader has a partial revolution clutch which halts the reader at the 0° and 220° positions in its cycle. In the present type of operation, the motor reader clutch MRC is always energized at the 220° cyclic position through the motor reader cam-actuated contacts 24, the normally closed contacts 11 and 12 of the relay CDR, and the normally closed contacts 11 and 12 of the relay TCC1. The next motor reader reading cycle begins near the end of the printer cycle when the printer cam-actuated contacts TC1 close at 250° of the printer cycle to reenergize the reader clutch magnet MRC at its 0° cyclic position. It is in this manner that the normal higher reading rate of the motor reader is reduced to the lower cyclic operating rate of the printer during all read out of data information from the motor reader to the printer.

The motorized reader having thus been placed in operation will continue to read, as in the case of the printer reader, until the motorized reader reads a stop code 1–2–4 by its contact bank 16 to interrupt the hold circuit and thus drop out the reader control relay MRCR or until either of the stop switches S4 or S5 is manually actuated for the same purpose. Thus this mode of operation of the motorized reader is in all respects analogous to that of the printer reader earlier described, and data information may thus be read from the punched tape or card of either for reproduction by the printer or recording by a byproduct tape punch or both.

As with the printer reader, the motorized reader may read an automatic nonprint code 3–4–5 by its contact bank 19 to energize the automatic nonprint relay ANP which through its now closed contacts 7 and 8 energizes the nonprint relay NP through the now closed contacts 11L and 12L of the switch relay SW, the normally closed contacts 1 and 2 of the motor reader common contacts MRCC, the now closed contacts 15 and 16 of the relay CR1, and the normally closed contacts 1 and 2 of the relay FCR. This effects an automatic nonprint operation in a manner similar to that earlier described but utilizing the motor reader contact bank 16 to read a print restore code supplied through the now closed contacts 4L–5L, 14L–15L, 5R–6R of the switch relay SW and the diode rectifiers CR7–CR10. A manual nonprint operation may also be effected by manual actuation of the nonprint switch S7 to energize the manual nonprint relay MNP which in turn energizes the nonprint relay NP and energizes MRCR (all thereafter being held to the end of each motor reader cycle through the contacts 2 and 3 of the motor reader common contacts MRCC). A manual skip operation is initiated as previously described, and is terminated by reading a skip restore code by the motor reader contact bank 16.

(3) Manual data search-nonsynchronous mode of system operation

As previously pointed out, one of the two principal functions of the motorized reader is to read tape wherein information is recorded as information items or blocks of information preceded by an identifying address. The address of any information thus desired must be supplied to the motorized reader before it can begin its search for such information. The identifying address of desired information is usually supplied manually for a manual data search operation, but may have been previously supplied and stored from a punched tape or card read by the printer reader.

An address is manually supplied by manual actuation of address selection switches S12, of which only the first-level address switch is here shown for simplicity but it will be understood that similar address switches for the code levels two through seven are provided and are manually set, to energize a first-level-code-storage relay R1 (and corresponding other higher-code-level storage relays not shown) upon energization of a motor search relay MSR in a manner presently to be explained. In this, the electrical circuitry including for each code level a set of motor reader contacts, address switch, storage relay, and individual pair of relay ASR contacts is like that shown for the first code level. Each of the switches S12 remains with its contacts closed when manually actuated to its address selection position, and remains with its contacts open when manually actuated to its nonselection position. Upon completion of manual setting of the address switches S12 to the desired address identity of information sought, a motor search operation is manually initiated by actuation of a motor search switch S21 to open its contacts S21a and close its contacts S21b.

Assume that at the time of actuation of the switch S21 the switch relay SW had been left by the preceding operation with its contacts latched up in transferred position (i.e. the relay winding MRS had been energized later in point of time than the unlatch relay winding PRS). The contacts S21b now complete an energizing circuit for a motor search relay MSR through the motor reader cam-actuated contacts 22, which are closed between 264° of one motor reader cycle and 190° of the next cycle and thus are closed when the motor reader is stopped, and the normally closed contacts 1 and 2 of the motor reader control relay MRCR. The motor search switch contacts S21b now also energize the address storage relays such as R1 and other like storage relays in accordance with the manual setting of the address selection switches S12 which as earlier mentioned remain set in their closed circuit or open circuit positions.

The storage relays R1 include contacts in a coincidence circuit 18; in particular, the first-code-level storage relay R1 has normally open contacts 2 and 3 which are in series with normally closed first-level code reading contacts 10 and 11 of the motorized reader contact assembly MRC1 and the relay R1 also includes normally closed contacts 1 and 2 connected in series with normally open first-level code reading contacts 9 and 10 of the motor reader contact assembly MRC1. Thus if the storage relay R1 should be selected by operation of the switch S12, the relay contacts 2 and 3 of the relay R1 would complete an electrically continuous circuit between the conductors 22 and 23 of the coincidence circuit 18 through the normally closed first-level code reading contacts 10 and 11 of the motor reader contact assembly MRC1. This electrical circuit continuity is interrupted if the motor reader reads a one-level code and thereby opens its first-level contacts 10 and 11 and closes its first-level contacts 9 and 10. Since there are similar arrangements of storage relay contacts associated with each pair of higher-level code reader contacts of the motorized reader, it will be appreciated that the coincidence circuit will maintain at least one continuous electrical circuit between its conductors 22 and 23 unless the code read by the motor reader is precisely the same as that identified by the address storage relays R1 selected by operation of the switches S12 and unless as a further condition an 8 level code is read to open the 8th level code reader contacts 7 and 8 of the motor reader contact assembly MRC8. It will be recalled that an address is always identified by the use of an 8th level code bit, and it is for this reason that the coincidence circuit must find an 8th level code bit as well as coincidence between identity of the address storage relay contact settings and the code reader contact positioning before coincidence of the address selected by the address storage relays and that read by the code reader is established.

As soon as the motor search relay MSR is energized in the manner just explained, it establishes a hold circuit for itself through the coincidence circuit 18 at the reading position of the reader contacts or through the motor reader cam-actuated contacts 22 from 264° of one reader cycle to 190° of the next cycle, the now closed contacts 1 and 2 of the search relay MSR, the motor reader tight tape contacts MSTT, the code reader tape contacts MSRT, the now closed contacts 15 and 16 of the motor search relay MSR, the normally closed contacts of the motor stop read switch S4, and the normally closed contacts of the printer stop read switch S5. The now closed contacts 7–8 and 15–16 of the motor search relay MSR also establish an energizing circuit for the motor reader control relay MRCR around the stop code 1–2–4 contacts of the motor reader contact bank 16 so that the motor reader control relay MRCR is not deenergized during a search operation by reason of the reading of a stop code by the motor reader. The contacts 3 and 4 of the motor search relay MSR open to deenergize the relay CR1 and CR2, if energized, so that the motor reader contacts have no control over the code translator of the printer or the byproduct tape punch.

Now when the motor search switch S21 is manually released to close its contacts S21a, a new energizing circuit is established for the motor reader clutch magnet MRC to place the motor reader in operation. This energizing circuit includes the cam actuated motor reader contacts 20 which open at 20° and close at 225° of each motor reader cycle, the now closed contacts 7 and 8 of the read control relay MRCR, the now closed contacts 12 and 13 of the motor search relay MSR, the normally closed contacts 3 and 4 of a relay ASR, the normally closed contacts 3 and 4 of the relay CR1, and the normally closed contacts of the switches S21, S4 and S5. The motor reader clutch magnet MRC is energized by the cam-actuated contacts 20 at the 0° cyclic position of the motor reader, and motor reader cam-actuated contacts 24 continue to energize the reader clutch magnet MRC at the 220° cyclic reading position through an energizing circuit which includes either the normally closed contacts 11 and 12 of a control delay relay CDR and the normally closed contacts 11 and 12 of a relay TCC1 or the normally open reader tape contacts RTC which close only when the end of the tape in the reader is sensed. Since the 0° and 220° energizing circuits of the reader clutch magnet MRC are effective continuously to energize the motor reader through successive cycles of reading operation (and independently of the printer cam-actuated contacts TC1) so long as the motor search relay MSR remains energized, the search proceeds independently and at a relatively high reading rate. As soon as the motor reader reads and address corresponding to that stored in the address storage relays R1, the electrical continuity of the coincidence circuit 1 is interrupted to deenergize the motor search relay MSR. This halts the search operation of the motor reader at its 0° cyclic position and conditions it to read out the next information item or block of information in a manner now to be explained.

As soon as the motor search relay MSR becomes deenergized as last mentioned, its contacts 3 and 4 close and the relays CR1 and CR2 are energized in the manner previously explained. The motor reader is now conditioned to effect automatic control of the printer operations or byproduct tape punch in the manner previously described. The motor reader clutch magnet MRC is energized at this time through a circuit which includes both the cam-actuated contacts 20 of the motor reader and the cam-actuated contacts TC1 of the printer, which open at 15° and close at 250° of each printer cycle. Thus while the motor reader reads at a high reading rate during search operations, since the reader clutch energizing circuit does not include the cam-actuated contacts TC1 of the printer, it is so controlled by the printer cam-actuated contacts TC1 during data read out to the printer in the manner above described that the motor reader rate is now reduced to that of the printer. Accordingly the motor reader reading rate is much lower as long as the motor reader is reading data information out to the printer for reproduction. This holds true also during manual and automatic nonprint operations of the printer where the latter continues to operate through successive cycles although effecting no printing of data information, thus insuring that the motor reader is maintained at a lower reading rate consistent with the recording of information at such lower rate in a byproduct tape punch when selected.

The read out of data information from the motor reader continues until the reader reads either a stop code 1–2–4 or an address identity code 1–3–4–5–7 which requests a further automatic search for information. A stop code 1–2–4 when now read by the motor reader contact bank 16 is effective to interrupt the hold circuit of the motor read control relay MRCR since this circuit is no longer bypassed around the motor reader contacts by reason of the now open contacts 15 and 16 of the motor search relay MSR. If the motor read control relay MRCR is so deenergized, its contacts 7 and 8 open to interrupt the energizing circuit of the motor reader clutch magnet MRC and thereby terminate operation of the motor reader. If on the other hand the motor reader bank of contacts 19 should read an address identity code 1–3–4–5–7, the motor search relay MSR is again energized through the coincidence circuit 18, the now closed contacts 2 and 3 of the motor read control relay MRCR, the normally closed contacts 4 and 5 of the relay TCC2, the address identity contacts of the contact bank 19, the now closed contacts 7 and 8 of the relay CR1, normally closed contacts 1 and 2 of the skip relay PSR, normally closed contacts 11 and 12 of the manual nonprint control relay MNP, and the normally closed contacts 13 and 14 of the automatic nonprint relay ANP. This reenergization of the motor search relay MSR will terminate readout of data information by deenergizing the relays CR1 and CR2 and initiate a new search to locate data at an address corresponding to that stored in the address storage relays R1. This new search operation and the subsequent read out of data information following location of the information addressed will proceed in the manner just described. It will accordingly be apaprent that where a data information item or block of information is terminated by an address identity code, all recorded information of the same address may be collated and read out to the printer by successive repeat search operations automatically performed. It should also be noted that the address of the information for which a repeat search is desired may be changed at any time by manual repositioning of the address identity switches S12.

A repeat search thus repetitively initiated will continue until a data information item or block of information is terminated by a stop code 1–2–4 to halt the search as above explained or until either of the stop switches S4 or S5 is actuated to deenergize the hold circuit of the motor read control relay MRCR by opening the contacts S4a or S5a of the switches S4 or S5. This actuation of the stop switch S4 or S5 will also halt a search in progress by deenergizing the motor search relay MRS as well as the read control relay MRCR, the relays CR1 and CR2 if energized at this time nevertheless being temporarily maintained energized (to complete the read out of a data item to the printer) until the stop switch S4 or S5 is manually released. This energizing circuit for the latter relays includes the normally closed contacts 3 and 4 of the control delay relay CDR, the now closed contacts 1 and 2 of the relay CR1, a diode rectifier CR3, the manually closed contacts S4b of the switch S4 and the normally closed contacts of the switch S5 or the manually closed contacts S5b of the switch S5.

During the progress of a search operation by the motor reader, any functional control codes read by the motor reader contact bank 19 are ignored since the energization of this reader bank is interrupted by the normally open contacts 7 and 8 of the relay CR1 which is deenergized during a search operation.

It was assumed during the preceding explanation of the search operation that it was initiated at a time when the switch relay SW had been left with its contacts latched up in a transferred position (i.e. that the relay winding MRS had been energized later in point of time than the unlatch relay winding PRS). Consider now the changed mode of search operation which results when the switch relay SW has its contacts in the unlatched position (the relay winding PRS last energized) at the time the motor search switch S21 is manually actuated. The search operation proceeds as above described by enregization of the search relay MSR and control relay MRCR, but now when coincidence of addresses deenergizes the search relay MSR the control relay MRCR is also deenergized since its hold circuit is interrupted by the now open contacts 15 and 16 of the search relay MSR and by the normally open contacts 12R and 13R of the switch relay SW. With the control relay MRCR thus deenergized, the motor reader operation is halted since the reader clutch magnet MRC energization is interrupted by the normally open contacts 7 and 8 of the control relay MRCR. The motor reader having thus completed the search, and standing in readiness to read out data information having the address sought, awaits further control to effect such read out.

(4) *Duplex (nonsynchronous) operation-system operation under alternate control of the printer reader and the motor reader*

Data information may be alternately supplied, automatically under program control, from both the printer reader and motor reader. This mode of operation also provides an additional mode of search operation by the motor reader. These new and different modes of operation will now be considered.

(a) *Duplex operation.*—The system includes a manually actuable duplex switch S3 which may be manually actuated to switch-open or switch-closed positions and which remains in the position to which it is manually set. For the operation here considered, the duplex switch S3 is manually actuated to its open contact position. A switch code 2–3–4 read by the printer reader contact bank 14 effects energization of the switch relay magnet MRS through the normaly closed contacts 4 and 5 of the relay TCC1 and of the motorized reader read control relay MRCR in the same manner as manual actuation of the motor start read switch S6. This transfers the reading operation from the printer reader to the motor reader. A switch code 2–3–4 now read by the motor reader contact bank 19 energizes the switch relay winding PRS and through normally closed contacts 14 and 15 of relay TCC2 energizes the print reader control relay PRCR much in the same manner as manual actuation of the printer start read switch S1, thus terminating reading by the motor reader and initiating reading by the printer reader. Accordingly a switch code read by either reader transfers the reading operation to the other until such time as the other reader itself reads a switch code to return reading to the first reader. Since the reader contact banks 14 and 19 are energized through the normally closed contacts 1 and 2 of the skip relay PRS, the contacts 11 and 12 of the manual nonprint relay MNP, and the contacts 13 and 14 of the automatic nonprint relay ANP, it is apparent that a switch code 2–3–4 read during either form of nonprint operation or during a skip operation is ignored by the system and does not effect transfer of reading to the other reader. The operation of either reader when operating is otherwise, however, that heretofore described.

(b) *Data information search initiated by the printer reader.*—When the duplex switch S3 has been manually actuated to open its contacts, it becomes possible for the printer reader to initiate an information search by the motor reader. Having initiated the search, the printer reader may continue reading data information to the printer or byproduct tape punch and the motor reader concurrently performs its search operation independently. If the motor reader completes its search before a switch code 2–3–4 is read by the printer reader, the motor reader operation halts in readiness to read the addressed data information; it proceeds to do so when a switch code read by the printer reader transfers the read operation to the motor reader. If the switch code is read prior to the time the motor reader has completed its search operation, all reading halts until the search operation is finished whereupon the motor reader immediately begins to read data information out to the printer and byproduct tape punch. The precise manner in which these several operations occur will be evident from the foregoing description of search operations by the motor reader and of the duplex (nonsynchronous) mode of operation by which reading is transferred between the motor reader and the printer reader.

When the printer reader initiates a search by the motor reader, it normally furnishes the address identity of the data which is the subject of the search. In doing this, the printer reader contact bank 14 will read an AID (address identification) code 1–3–4–5–7 which thereupon energizes relay AR1. The contacts 4 and 5 of the latter relay now close to pick up relay AR2, the relay AR1 being held through its normally open contacts 16 and 17, the normally closed contacts 13 and 14 of relay AR2, the normally closed contacts 14 and 15 of the motor search relay MSR, and the normally closed contacts of the motor stop switch S4 and print reader stop switch S5. Thus as soon at the relay AR2 picks up, its contacts 13 and 14 open to deenergize the hold circuit last described for the relay AR1, the relay AR2 now holding through its normally open contacts 14 and 15 and the hold circuit last mentioned. The normally open contacts 4 and 5 of the relay AR2 now close to pick up an auto select relay ASR through the now closed contacts 3 and 4 of the relay AR1 from the energizing circuit last mentioned.

The next code read by the printer reader is an address code of the information to be located by the search, and the printer reader contacts PRC1 (together with other higher level code contacts not shown) energize the storage relays R1 through the normally open contacts 6 and 7 of the relay ASR (there being a higher code-level storage relay and a corresponding pair of contacts of the relay ASR associated with each higher level reader contact of the reader) thus storing the address of the data to be located. Preparatory to storing this address, it will be noted that any previously energized address storage relay R1 was maintained energized by a hold circuit which includes the normally open contacts 4 and 5 of the relay R1, and a jumper 25 which may be connected either between the terminal 26 and (as indicated in broken lines) plug-board class hold terminals 27 to complete the hold circuit through the normally closed contacts 1 and 2 of a class hold relay RHC or between the terminal 26 and an item plug-board terminal 28 to complete the hold circuit through the normally closed contacts 21 and 22 of the relay AR1 and the normally closed contacts of the switches S21, S4 and S5. It will be understood that the hold contact 4 of others of the address storage relays not shown may similarly be connected to either of the plug-board terminals 27 and 28. Assuming for the moment that all of the relay R1 hold circuits extend by way of plug-board terminals 28, the normally closed contacts 21 and 22 of the relay AR1 open when the latter is energized as last mentioned and thus interrupt the holding circuit of any address storage relays R1 previously energized. The energization of the relay AR1 accordingly serves to erase any address previously stored in the storage relays R1 and prepare the latter to store the new address read from the printer reader. In preparation for this automatic search operation, all of the manual address select switches S12 are manually moved to open their contacts. In thus storing the address in the storage relays R1, it may be noted that the normally open contacts 16 and 17 of the relay AR2 are now closed which thus energizes the 8-level translator magnet of the printer. Such energization prevents selection of all printer keylevers except the carriage return keylever, but selection of the latter at this time is prevented by the fact that the address includes code bits which energize other translator magnets and thereby prevent carriage return keylever selection. This translator energization thus causes the address read by the printer reader to be ignored by and effect no operation of the printer.

The address storage operation just described assumed that all of the relay R1 hold circuits extended to the item plug-board terminals 28 so that all of the address relays R1 became deenergized upon opening of the normally closed contacts 21 and 22 of the relay AR1. Consider now the changed operation which prevails when a number of the storage relay hold circuits extend to the class hold plug-board terminals 27. It is evident that these storage relays are not deenergized when the relay AR1 is energized to store a new search address, but rather are retained energized through the normally closed contacts 1 and 2 of the relay RHC to retain storage of a partial address (the class address) so that the newly stored search address need only relate to items to be searched within the class. Erasure of this class address thus stored may be effected by energizing the relay RHC. This is accomplished by supplying a search address which effects energization of all item storage address relays, and thereby effects closure of the contacts 24 and 25 of all of the item and class storage relays here indicated for convenience of reference as relays R1 and R1–2 through R1–7. The relay RHC remains energized through its now closed contacts 3 and 4 and the normally closed contacts 21 and 22 of the relay AR1 so that the hold circuit of the class address relays become deenergized by opening of the contacts 1 and 2 of the relay RHC and remains so until the succeeding address storage operation effects energization of the relay AR1 and thereby deenergizes the relay RHC by interruption of its hold circuit.

The address of the data desired having been stored in the storage relays R1 as above described, the next printer cycle effects closure of the contacts 3 and 4 of the reader common contact PRCC to energize the motor search relay MSR through the now closed contacts 1 and 2 of the relay ASR. As previously explained, the normally open contacts 1 and 2 and 15 and 16 of the search relay MSR complete a hold circuit for this relay through the coincidence circuit 18 and its normally open contacts 7 and 8 establish an energizing circuit for the motor reader control relay MRCR. The normally closed contacts 14 and 15 of the relay MRS now open to interrupt the energizing circuit of the relay AR2 which, however, continues to remain energized temporarily through its now closed contacts 9 and 10 and the reader common contacts PRCC. The contacts 4 and 5 of the relay AR2 now open to interrupt the energizing circuit of the auto select relay ASR. The motor reader clutch MRC is now energized through its high speed reader energizing circuit which includes the cam-actuated contacts 20 and 24 of the motor reader, the now closed contacts 7 and 8 of the reader control relay MRCR, the now closed contacts 12 and 13 of the search relay MSR, the normally closed contacts 3 and 4 of the relay ASR and the normally closed contacts 3 and 4 of the relay CR1, and the normally closed contacts of the manually actuable switches S21, S4 and S5.

The motor reader now begins its search at high reading rate and the search is terminated as above described when identity of addresses is found. Since the motor search is terminated by deenergization of both the search relay MSR and control relay MRCR for reasons previously mentioned, the motor reader halts awaiting the reading of a switch code 2–3–4 by the printer reader to cause the motor reader to read out the data information located by the search. Each information item or block of information so read out is normally terminated by a switch code 2–3–4 to effect return of the reading operation back to the printer reader. However should the information read out by terminated by an address identification code, rather than a switch code, repeat searching ensues for all information having the address stored in the address storage relays R1 and the last of such information can be terminated by a stop code or a switch code as desired.

(5) *Synchronous operation*

In the synchronous mode of the system operation, the motorized reader programs all operations and accordingly directly controls reading operations of the printer reader. Both the motorized reader and the printer reader may supply alpha-numeric information, symbols, and functional control information for controlling the printing operations of the printer and recording operations of the byproduct tape punch, there being only the difference that the printer reader ignores any program control information read by it. Function control information may thus be freely supplied by the motorized reader or step-by-step by the printer reader under command of the motorized reader, but function controls so supplied by the printer reader may only be those functions which are recognized as keylever operations by the printer.

Automatic nonprinting operations may originate only under control of the motorized reader, and continue until a print restore code is read by the motorized reader. During these nonprint operations, data information may be supplied to the byproduct tape punch by either the motorized reader or the printer reader. Any function codes read by the printer reader during automatic nonprint operations are ignored by this reader. Automatic nonprint operations may be manually halted, but cannot be manually stopped. A manual nonprint operation affects only the motorized reader, and continues until a stop code is read by the motorized reader or until the nonprint operation is manually terminated. During such manually initiated nonprint operations, all program codes read by the motorized reader other than a stop code are ignored.

A manual skip operation affects only the motorized reader, and continues until a skip restore code is read by the motorized reader or the operation is manually terminated. During such skip operation, all program codes read by the motorized reader other than the skip restore code are ignored. Programmed skip by the printer reader is under specific control of the motorized reader and is restricted to a single information item read by the printer reader for each skip command read by the motorized reader. Automatic search operations by the motorized reader are initiated in the synchronous mode of operation only under program control of the motorized reader, and the search address is now supplied by the printer reader under read control of the motorized reader. The printer reader may supply item or class portions of the address and may erase the class portion of a previously stored address in the manner heretofore described, and in addition the motorized reader may also supply either the item or class portions of the address prior to the supply of an item or class portion by the printer reader, or the motorized reader may erase in entirety a previously stored address prior to the subsequent supply of item and class portions of the address by the printer reader. When an automatic search operation is initiated, which automatically takes place upon readout of the an address from the printer reader, readout of both the motorized and printer reader halts until the automatic search operation is completed. Repeat searches automatically following one another in the manner heretofore described are not used in the synchronous mode of system operation. Two types of synchronous operational control are available. With the duplex switch S3 in its duplex position (its contacts open), the system may be placed in and removed from synchronous operation freely and at will under program control of the motorized reader. With the duplex switch S3 moved to close its contacts, the system upon being placed in synchronous operation under program control of the motorized reader can be subsequently removed from the synchronous operational state only by manually moving the duplex switch S3 to its duplex position or by initiating a motorized reader search operation either manually by operation of the motor search switch S21 or under program control.

The system is placed in the synchronous mode of operation when the motorized reader reads a code skip code (1–3–4–6–7) to energize a synchro select relay SSR. The latter holds through its now closed contacts 4 and 5 and the normally closed contacts 1 and 2 of a synchro off relay SOR. Now when the contacts 2 and 3 of the motorized reader common contact MRCC close at the completion of the reader cycle which energized the relay SSR, the now closed contacts 24 and 25 of the latter energize relays TCC1 and TCC2 through the normally closed contacts 11 and 12 of the synchro off relay SOR, a diode rectifier CR12, and the normally closed contacts 3 and 4 of the motor search relay MSR. The relays TCC1 and TCC2 hold during each motorized reader read cycle through the now closed contacts 28 and 29 of the relay TCC1, a diode rectifier CR13, the normally open contacts 1 and 2 of the motorized reader common contacts MRCC, and the normally closed contacts 3 and 4 of the motor search relay MSR. If the code skip code which energized the relay SSR is followed by a stop code as to permit manual printing operations, the system is returned to automatic operation by manual actuation of either the motor start read switch S6 or the printer start read switch S1 to effect energization of the motor read control relay MRCR and concurrently to effect energization of the printer read control relay PRCR through the now closed contacts 15 and 16 of the relay TCC2. The relay MRCR holds through its now closed contacts 13 and 14 and the stop code contacts of the motorized reader contact bank 16. The relay PRCR holds through its now closed contacts 1 and 2, the tape contacts PSRT, and now closed contacts 9 and 10 of the relay TCC2 to the holding circuit of the relay MRCR.

Upon energization of the relay MRCR as last described, its contacts 15 and 16 close to energize the control delay relay CDR through the normally closed contacts 17 and 18 of the relay CR1 and the normally closed contacts 17 and 18 of the motor search relay MSR. The control delay relay CDR establishes a hold circuit for itself through its normally open contacts 15 and 16 and the normally closed contacts of the motor stop switch S4 and printer stop switch S5. The relay CDR thereupon closes its contacts 5 and 6 to energize the relays CR1 and CR2, as previously described, and the contacts 5–6 and 17–18 of the relay CR1 thereupon open to deenergize the relay CDR. Now upon release of the motor start read switch S6 or the printer start read switch S1, the motor reader clutch magnet MRC is energized through an energizing circuit previously described and which includes the normally closed contacts of the switches S1 and S6 so that the motorized reader is placed in reading operation. The contacts 11 and 12 of the relay TCC2 open and its contacts 12 and 13 close to exclude from the energizing circuit of the reader clutch magnet MRC the printer cam-actuated contacts TC1 so that the motorized reader clutch magnet MRC is continuously energized at its 0° cyclic position. The contacts 11–12 of the relay TCC1 open and its contacts 12–13 close to transfer control of the energization of the motor reader clutch magnet MRC at the 220° cyclic reader position to the cam-actuated contacts TC3 of the printer, thus to cause the motor reader to halt in its fast reading operation at 220° of its reading cycle until released by the printer-cam-actuated contacts TC3 which close at 82° of the printer cycle and open at 140° of the latter. The contacts 17–18 of the relay TCC1 open and its contacts 18–19 close to insert the motorized reader cam-actuated contacts 30 into the energizing circuit of the translator clutch magnet TC and translator magnets TC1 and the punch clutch magnet PC and the punch magnets P1, thus restricting the energization of this circuit to the cyclic range of 215° when the contacts RCC5 close to 265° when the contacts 30 open in each motorized reader cycle. The reason for so inserting the cam-actuated contacts 30 is concerned with the step-by-step reading control of the printer reader by the motorized reader. For example, a switch or skip code read by the motorized reader energizes the code read relay CRR or code skip relay CSR to cause one cycle of operation by the printer reader. Such code is sensed when the motorized reader contacts of its contact bank 19 close at about 81° of the reader cycle to energize the relay CRR or CSR. The cam-actuated contacts 30 thus remain open until 215° of the motorized reader cycle to prevent energization of the printer translator magnet TC or punch magnet PC by the reader common contacts MRCC until the relay CRR or CSR has become energized (if such is required) and thus open their contacts 1 and 2 to deenergize the motor reader common contacts MRCC.

With the motor reader control relay MRCR energized and its contacts 5 and 6 closed to hold the relays CR1 and CR2 energized as previously described, the translator clutch magnet TC of the printer is energized through the motorized reader common contacts MRCC and cam-actuated contacts 30 and the translator magnets TC1 are energized, through the motor reader code contacts MRC1 as previously explained. The energization of the punch clutch magnet PC and punch magnets P1 is that previously described. Thus the motorized reader reads and supplies alpha-numeric information, symbols, and function control information to the printer for control of the latter in printing information and for control of the byproduct tape punch in recording such information.

A manual search operation is effected by manual operation of the switch S21, and proceeds in the manner previously described but with the one difference that the printer read control relay PRCR is now energized from the hold circuit of the relay MRCR through the now closed contacts 8 and 9 of the relay TCC1, the normally closed contacts 11 and 12 of the code skip relay CSR, and the contacts 11 and 12 of the code read relay CRR. The relay PRCR now holds as before through its now closed contacts 1 and 2.

If the nonprint switch S7 should be manually actuated during operation of the motorized reader, the manual nonprint relay MNP and nonprint relay NP are energized in the manner previously explained, and both hold from the hold circuit of the relay MRCR through the now closed contacts 2R and 3R of the switch relay SW, the contacts 7–8 and 13–14 of the relay MNP, and the now closed contacts 16–17 of the relay NP. The nonprint relays will accordingly hold until a stop code 1–2–4 is read by the motorized reader or until the motor stop switch S4 or printer stop switch S5 is manually actuated to interrupt the hold circuit of the motor reader control relay MRCR and thus the hold circuit of the nonprint relays (noting, however, that manual actuation of the stop switch S4 to close its contacts S4b or of the switch S5 to close its contacts S5b is effective to hold the nonprint relays until the stop switch is manually released, after which the relays may hold only temporarily through the rectifier CR2 and motor reader common contacts MRCC 2 and 3 in the event that the relay CR1 contacts 15 and 16 have not yet opened).

Automatic nonprint operations are effected when the motorized reader reads a nonprint code 3–4–5 to energize the automatic nonprint relay ANP and the nonprint relay NP to accomplish a nonprint operation in the manner previously described. In addition, the now closed contacts 17 and 18 of the relay TCC2 energize a motor automatic nonprint relay MANP to close its contacts 7–8 and 18–19 and thus establish a hold circuit for the nonprint relays which excludes the rectifier CR2, contacts 14 and 15 of the relay TCC1, and contacts 15 and 16 of the relay CR1. The contacts 15 and 16 of the motor automatic nonprint relay MANP also close to maintain energization of the motor reader contact bank 19 during the automatic nonprint operation, so that the printer reader may be controlled in a manner presently to be described, by a switch code 2–3–4 read by the motorized reader during the nonprint operation and thus enable data information to be supplied to the byproduct tape punch by either the motorized reader or printer reader during the automatic nonprint operation.

Manual actuation of the skip switch S8 effects energization of the skip control relay SCR and skip relay PSR and accomplishes a skip operation in the manner previously described. The hold circuit for the relay SCR includes its now closed contacts 8 and 9, the now closed contacts 5 and 6 of the printer read control relay PRCR and in parallel therewith the now closed contacts 17 and 18 of the motorized reader control relay MRCR, the contacts 4L and 5L of the switch relay SW, the normally closed contacts 5 and 6 of the motor automatic nonprint relay MANP, the now closed contacts 19 and 20 of the relay TCC2, and the rectifiers CR7–CR10 to the motorized reader contact bank 16 which is energized at this time through the now closed contacts 12R and 13R of the switch relay SW. The skip operation thus continues until a skip restore code 1–3–4 is read by the motorized reader contact bank 16 or until the motor stop switch S4 or printer stop switch S5 is manually actuated (noting, however, that the manual actuation of switch S4 or S5 to close their respective contacts S4b or S5b maintains the relay PSR energized through its now closed contacts 3 and 4 until the switch S4 or S5 is manually released). Contacts 15 and 16 of the skip control relay SCR are shunted around the contacts 13 and 14 of the motor read control relay MRCR to pick up the latter when the skip switch S8 is manually actuated.

A switch code 2–3–4 when read by the motorized reader in the synchronous mode of system operation treats this code as a read-1 code by which to effect the reading of one item of data information (one tabulating card column, for example) by the printer reader. To this end, a code read relay CRR is energized through the now closed contacts 2 and 3 of the relay TCC1 by the switch code (read-1) output of the motorized reader contact bank 19. The motor reader contacts of its bank 19 remain closed until about 266° of the reader cycle, and the relay CRR holds through its now closed contacts 18 and 19, the normally closed contacts 3 and 4 of a code skip relay CSR, and the cam-actuated contacts 29 of the motorized reader which are closed from 264° of one reader cycle to 84° of the next reader cycle. The control relay CRR now energizes the control delay relay CDR through the now closed contacts 9 and 10 of the relay CRR, and the normally closed contacts of the stop switches S4 and S5. The contacts 11–12 and 12–13 of the relay CDR now transfer to cause the printer reader common contacts PRCC to energize the motor reader clutch magnet MRC past its 220° cyclic position through the now closed contacts 15 and 16 of the relay TCC1. This causes the motorized reader to halt for one cycle in its operation while the printer reader is executing a cycle of operation.

The normally closed contacts 3 and 4 of the relay CDR now open to deenergize the relays CR1 and CR2. The now closed contacts 1 and 2 of the relay CDR maintain the motorized reader contact bank 19 energized, even though the contacts 7 and 8 of the relay CR1 open, thus to maintain the motorized reader contact bank 19 energized to read successive switch (read-1) codes. Note in this respect that two successive such codes should reenergize the relay CRR at about 81° when the reader contacts close and before the hold circuit for this relay is interrupted by the reader cam-actuated contacts 29 at 84° of the reader cycle so that this relay and the relay CDR remain energized and the relays CR1 and CR2 deenergized through successive reader cycles when successive switch (read-1) codes are read. The contacts 1–2 and 17–18 of the relay CR2 thereupon open to terminate energization of the translator magnet TC1 of the printer by the motor reader code contacts MRC1, and the contacts 12 and 13 of the relay CR1 open to terminate energization of the translator clutch TC by the motor reader common contacts MRCC. Thus the translator clutch TC and translator magnets TC1 must be energized by the printer reader common contacts PRCC and code reading contacts PRC1. The contacts 16 and 17 of the relay CRR energize the printer reader clutch magnet PRC through the now closed contacts 3 and 4 of the printer read control relay PRCR so that the printer reader executes a cycle of operation and in doing so energizes the motorized reader clutch MRC past its 220° cyclic position. The read control relay CRR becomes deenergized at 84° of the next motor reader cycle unless a further switch (read-1) code is read by the motorized reader to maintain relay CRR energized as earlier explained, but the control delay relay CDR yet holds through its now closed contacts 15 and 16 and the now closed contacts 5 and 6 of the relay CR1. Accordingly the control relays CR1 and CR2 are again energized through the now closed contacts 5 and 6 of the control delay relay CDR as soon as the contacts 13 and 14 of the relay CRR close. The contacts 5–6 and 17–18 of the relay CR1 now open to deenergize the control delay relay CDR. The contacts 16 and 17 of the control relay CRR are now open, so that the printer reader clutch PRC is no longer energized beyond its one read cycle. The motorized reader thereupon resumes its normal reading operation. It may be noted that during the one cycle read operation of the printer reader, the contacts 1 and 2 of the relay TCC2 are opened to deenergize the printer reader contact bank 14 for the purpose of causing the printer reader to ignore such functional codes as nonprint, print restore, switch, address identification, and data select. All such functional codes must originate in the motorized reader during the synchronous mode of system operation.

After the first skip code 1–3–4–6–7 is read by the reader contact bank 19 of the motorized reader to energize the synchro select relay SSR, any further skip codes cause a code skip relay CSR to be energized through the now closed contacts 7 and 8 of the relay TCC1. It is the purpose of this relay to cause the printer reader to operate through one read cycle, yet to skip the information read by it during this cycle. The relay CSR holds through the normally closed contacts 3 and 4 of the relay CRR and its own now closed contacts 4 and 5 and the cam-actuated reader contacts 29 of the motorized reader, thus holding from 264° of one motorized reader cycle to 84° of the next reader cycle. The normally closed contacts 1 and 2 of the skip relay open to prevent energization of the motorized reader common contacts MRCC when the cam-actuated contacts 30 of this reader close at 215° of the reader cycle. The now closed contacts 9 and 10 of the relay CSR energize the control delay relay CDR which effects the operations previously described in connection with the relay CRR to cause the motorized reader to halt for one reading cycle while the printer reader is caused to execute a reading cycle by energization of its reader clutch PRC through the now closed contacts 16 and 17 of the relay CSR. There is the difference as between the read-1 operation previously described and the code skip operation presently described that the contacts 7–8 and 18–19 of the skip relay CSR close to energize the 5th level and 8th level translator magnets of the printer by which a spurious code is injected into the translator to render the latter ineffective to cause any printer operation (the 8th level translator magnet energization prevents selection of all keylevers except the carriage return keylever, and the 5th level translator energization prevents the selection of the carriage return keylever). Thus the motorized reader halts for one reading cycle while the printer reader executes a reading cycle but skips the information read during this cycle.

(a) *Automatic data searching—synchronous mode of operation.*—An automatic search operation is initiated when the motorized reader contact bank 19 reads an address identification (AID) code 1–3–4–5–7 to energize the relay AR1 through the now closed contacts 5 and 6 of the relay TCC2 (the now open contacts 4 and 5 of the relay TCC2 prevent direct energization of the motor search relay MSR in the synchronous mode of operation). It will be noted that the energizing circuit of the reader contact assembly 19 includes the contacts 7 and 8 of the relay CR1 so that this relay must be energized for the AID code to effect energization of the relay AR1. The latter relay in turn effects energization of the relay AR2 which in turn energizes the automatic search relay ASR as previously described. The contacts 21 and 22 of the relay AR1 interrupt the hold circuit of any item address relays R1 previously energized (and interrupt the hold circuit of the class hold relay RHC if energized) as previously described, and the contacts 6 and 7 of the relay ASR now close to permit energization of the address storage relays R1 from the motor reader code contacts MRC1 or the print reader code contacts PRC1. Thus it may be noted that the motorized reader, after reading an AID code, may read a following partial address code to store a partial address in storage relays R1. This partial address code may supplement that which is supplied from the printer reader in a manner presently to be described, or may by appropriate energization of the class hold relay RHC effect interruption of the hold circuit of class relays previously energized and thus drop out these relays. In the latter event, a further AID code read by the motorized reader will again energize the relay AR1 to interrupt the hold circuit of the class hold relay RHC and thus prepare the storage relays R1 to receive an entirely new storage address.

Having thus energized the automatic search relay ASR in preparation for an automatic search operation, the motorized reader will read a switch code 2–3–4 (read-1) to cause the printer reader to perform a cycle of reading operation in the manner above described. This cycle of reader operation causes the printer read contacts PRC1 to energize the address storage relays R1 in the manner previously described and thus store the address of the data to be searched. During this printer read cycle, the now closed contacts 16 and 17 of the relay AR2 energize the 8th level translator magnet of the printer so that the address read by the printer reader during its cycle of operation becomes a spurious code to be ignored by the translator (the 8th code level preventing selection of all printer keylevers except the carriage return keylever which thus becomes spurious when any other code bit is also read and applied to the translator). The energization of the 8th level translator magnet also occurs during read of the AID code by the motorized reader, so that again the translator of the printer receives a spurious code and ignores it. During this reader cycle, the printer reader common contacts PRCC 3 and 4 close to energize the motor search relay MSR through the now closed contacts 1 and 2 of the automatic search relay ASR. The contacts 14 and 15 of the motor search relay MSR thereupon open to interrupt the hold circuit of the relay AR2 (although the latter holds through its now closed contacts 9 and 10 and the printer reader common contacts PRCC until the latter again open near the end of the printer reader cycle), which thereupon opens its contacts 4 and 5 to deenergize the automatic search relay ASR. The motor search relay MSR now holds through the coincidence circuit contacts 18, and the contacts 3 and 4 of the motor search relay MSR open to deenergize the CR1 and CR2 relays and to deenergize the relays TCC1 and TCC2. The motor reader code contacts MRC1 (and higher level code contacts not shown) are thus disconnected from the translator magnets TC1, and the translator clutch magnet TC is disconnected from the motorized reader cam-actuated contacts 30 and the motorized reader common contacts MRCC. With the relays TCC1 and TCC2 deenergized, and the motor search relay MSR energized, the motorized reader performs a search at high reading rate as previously described until the relay MSR is deenergized by the condition of address identity as determined by the coincidence contact circuit 18. The contacts 3 and 4 of the motor search relay MSR thereupon close to reenergize the relays TCC1 and TCC2 and again reenergize relays CR1 and CR2 so that the motorized reader proceeds to read out to the printer the data information located as a result of the search operation.

(b) *Termination of synchronous mode of operation.*— The synchronous mode of operation is terminated when the motorized reader reads a synchronous off code 2–4–5 to energize a synchronous off relay SOR through normally closed contacts 27 and 28 of the automatic nonprint relay MANP (thus preventing programmed termination of the synchronous mode during a programmed nonprint operation). Contacts 1 and 2 of the relay SOR thereupon interrupt the hold circuit of the synchronous select relay SSR. If the duplex switch S3 is positioned at this time in the duplex position (its contacts open), the relays TCC1 and TCC2 are deenergized by the now open contacts 11 and 12 of the relay SOR and the system returns to the duplex form of operation. If on the other hand the duplex switch S3 is positioned at this time with its contacts closed, a hold circuit is established for the relay SOR through the switch S3 and the normally closed contacts 3 and 4 of the motor search relay MSR. The now closed contacts 4 and 5 of the relay SOR maintain the relays TCC1 and TCC2 energized through the duplex switch S3 so that the system is retained in its synchronous mode of operation. In this case the synchronous mode of operation must be terminated either by manual actuation of the duplex switch to the duplex position (its contacts open) or by initiation of a manual or programmed motor search operation to effect energization of the motor search relay MSR, in either of which events the hold circuit of the relay SOR is interrupted and the relays TCC1 and TCC2 are deenergized.

The receptacles JD1 (and corresponding receptacles for the 2nd through 8th code level translator magnets not shown), JD9, and JD11 through JD16 permit (upon removal of the conductor 10 between receptacles JD13 and JD14) selection of manually inserted data as described above.

While there have been shown and described and pointed out the novel features of the invention as applied to a preferred embodiment, it will be understood that various omissions and substitutions and changes in the form and details of the system and in its operation may be made by those skilled in the art without departing from the spirit of the invention. It is the intention, therefore, to be limited only as indicated by the scope of the following claims.

What is claimed is:

1. A data translation system comprising first and second cyclically operating reading means for reading individual ones of two record media to derive for each of successive operating cycles of each said reading means and to make available for utilization individual data and functional-control items of information recorded in individual ones of said media, control means for so controlling the operations of said first and second reading means that in a first operative state of said control means at least one preselected functional-control item of information read by either of said reading means halts the reading operation thereof and initiates reading operation of the other thereof and in a second operative state of said control means each reading of at least one preselected functional-control item of information by one of said reading means halts the operation thereof for one cycle and initiates one cycle of operation of the other of said reading means, and means responsive to alternate reading by said one reading means of two further items of preselected functional-control information for alternating said control means between said first and second operative states thereof.

2. A data translation system comprising first and second cyclically operating reading means for reading individual ones of two record media to derive for each of successive operating cycles of each said reading means and to make available for utilization individual data and functional-control items of information recorded in individual ones of said media, control means for so controlling the operations of said first and second reading means that in a first operative state of said control means at least one preselected functional-control item of information read by either of said reading means halts the reading operation thereof and initiates reading operation of the other thereof and in a second operative state of said control means each reading of at least one preselected functional-control item of information by one of said reading means halts the operation thereof for one cycle and initiates one cycle of operation of the other of said reading means, means responsive to reading by said one reading means of preselected other function-control information for actuating said control means to said second operative state thereof, and means responsive to reading by said one reading means of preselected additional functional-control information for actuating said control means to said first operative state thereof.

3. A data translation system comprising first and second cyclically operating reading means for reading individual ones of two record media to derive for each of successive operating cycles of each said reading means and to make available for utilization individual data and functional-control items of information recorded in individual ones of said media, control means for so controlling the operations of said first and second reading means that in a first operative state of said control means at least one preselected functional-control item of information read by either of said reading means halts the reading operation thereof and initiates reading operation of the other thereof and in a second operative state of said control means each reading of at least one preselected functional-control item of information by one of said reading means halts the operation thereof for one cycle and initiates one cycle of operation of the other of said reading means, operational mode selection means having two operative states, and means responsive to one operative state of said selection means and to alternate and successive reading by said one reading means of two additional and individual items of preselected functional-control information for alternating said control means between said first and second operative states thereof but responsive to the other operative state of said selection means and to the reading by said one reading means of said additional items of functional-control information for changing said control means from said first to said second operative states thereof and for thereafter maintaining said control means in said second operative state thereof.

4. A data translation system comprising first and second cyclically operating reading means for reading individual ones of two record media to derive for each of successive operating cycles of each said reading means and to make available for utilization individual data and functional-control items of information recorded in individual ones of said media, control means for so controlling the operations of said first and second reading means that in a deenergized state of said control means at least one preselected functional-control item of information read by either of said reading means halts the reading operation thereof and initiates reading operation of the other thereof and in an energized state of said control means each reading of at least one preselected functional-control item of information by one of said reading means halts the operation thereof for one cycle and initiates one cycle of operation of the other of said reading means, means responsive to alternate and successive reading by said one reading means of two further items of preselected functional-control information for alternating said control means between said deenergized and energized states thereof, and means selectably controllable to two operative states in one of which said control means is alternately deenergized and energized by said last-mentioned means and in the other of which operative states said control means is maintained energized upon establishment of said energized state thereof by said last-mentioned means.

5. A data translation system comprising first and second cyclically operating reading means for reading individual ones of two record media to derive for each of successive operating cycles of each said reading means and to make available for utilization individual data and functional-control items of coded information recorded in individual ones of said media, control means for so controlling the operations of said first and second reading means that in a first operative state of said control means a preselected functional-control item of coded information read by either of said reading means halts the reading operation thereof and initiates reading operation of the other thereof and in a second operative state of said control means each reading of said preselected functional-control item of coded information by one of said reading means halts the operation thereof for one cycle and initiates one cycle of operation of the other of said reading means, and means responsive to alternate reading by said one reading means of two further preselected and distinctive functional-control items of coded information for alternating said control means between said first and second operative states thereof.

6. A data translation system comprising first and second cyclically operating reading means for reading individual ones of two record media to derive for each successive operating cycles of each said reading means and to make available for utilization individual data and functional-control items of coded information recorded in individual ones of said media, operational mode relay control means for so controlling the operations of said first and second reading means that in a first operative state of said relay control means a preselected functional-control item of coded information read by either of said reading means halts the reading operation thereof and initiates reading operation of the other thereof and in a second operative state of said relay control means each reading of said preselected functional-control item of coded information by one of said reading means halts the operation thereof for one cycle and initiates one cycle of operation of the other of said reading means, first relay selection control means energized by the reading by said one reading means of a further preselected item of functional-control coded information for actuating said relay control means to and maintaining it in said second operative states thereof, and second relay selection control means energized by the reading by said one reading means of an additional preselected item of functional-control coded information for deenergizing said first relay selection control means to restore said control means to said first operative state thereof.

7. A data translation system comprising first and second cyclically operating reading means for reading individual ones of two record media to derive for each of successive operating cycles of each said reading means and to make available for utilization individual data and functional-control items of information recorded in individual ones of said media, control means for so controlling the operations of said first and second reading means that in a first operative state of said control means at least one preselected functional-control items of information read by either of said reading means halts the reading operation thereof and initiates reading operation of the other thereof and in a second operative state of said control means each reading of at least one preselected functional-control items of information by one of said reading means halts the operation thereof for one cycle and initiates one cycle of operation of the other of said reading means, means for placing said one reading means in uninterrupted search reading operation until data having a preselected address is found in the medium read by said one reading means, and means controlled by alternate reading by said one reading means of two further items of preselected functional-control information for alternating said control means between said first and second operative states thereof but responsive to each state of search reading operation of said one reading means for placing said control means in said first operative state thereof for the duration of said each search operation.

8. A data translation system comprising first and second cyclically operating reading means for reading individual ones of two record media to derive for each of successive operating cycles of each said reading means and to make available for utilization individual data and functional-control items of information recorded in individual ones of said media, control means for so controlling the operations of said first and second reading means that in a first operative state of said control means at least one preselected functional-control item of information read by either of said reading means halts the reading operation thereof and initiates reading operation of the other thereof and in a second operative state of said control means each reading of at least one preselected functional-control item of information by one of said reading means halts the operation thereof for one cycle and initiates one cycle of operation of the other of said reading means, means for causing said one reading means to effect search reading to locate in the record medium read thereby data having a preselected address, selection control means having two operative states, means responsive to reading by said one reading means of a preselected other functional-control item of information for actuating said control means to said second operative state thereof, means responsive to reading by said one reading means of a preselected additional functional-control item of information for maintaining said control means in said second operative state when said selection control means has one operative state and for actuating said control means to said first operative state thereof when said selection control means has a second operative state, and means responsive to each search reading operation of said one reading means for returning said control means to said first operative state only for the duration of the search operation when said selection control means has said second operative state thereof but continuing beyond the duration of the search operation when said selection control means has said one operative state thereof.

9. A data translation system comprising first and second cyclically operating reading means for reading individual ones of two record media to derive for each of successive operating cycles of each said reading means and to make available for utilization individual data and functional-control items of information recorded in individual ones of said media, control relay means for so controlling the operations of said first and second reading means that in a deenergized state of said control relay means at least one preselected functional-control item of information read by either of said reading means halts the reading operation thereof and initiates reading operation of the other thereof and in an energized state of said control relay means each reading of at least one preselected functional-control items of information by one of said reading means halts the operation thereof for one cycle and initiates one cycle of operation of the other of said reading means, a switch manually operable between closed-circuit and open-circuit positions, a first relay energized by said one reading means in reading a further item of preselected functional-control information and effective when enerigzed to energize said control means, and a second relay energized by said one reading means in reading an additional item of preselected functional-control information for deenergizing said first relay and for maintaining said second relay and said control means energized through the closed-circuit position of said switch.

10. A data translation system comprising first and second cyclically operating reading means for reading individual ones of two record media to derive for each of successive operating cycles of each said reading means and to make available for utilization individual data and functional-control items of information recorded in individual ones of said media, control relay means for so controlling the operations of said first and second reading means that in a deenergized state of said control relay means at least one preselected functional-control item of information read by either of said reading means halts the reading operation thereof and initiates reading operation of the other thereof and in an energized state of said relay control means each reading of at least one preselected functional-control item 1f information by one of said reading means halts the operation thereof for one cycle and initiates one cycle of operation of the other of said reading means, means for causing said one reading means to effect an uninterrupted search reading operation to locate in the record medium read thereby data having a preselected address, a switch having electrical contacts manually operable to closed-circuit and open-circuit position, a first electrical relay energized by said one reading means in reading a further item of preselected functional-control information and effective when energized to energize said control means, a second electrical relay energized by said one reading means in reading an additional item of preselected function-control information for deenergizing said first relay and for maintaining said second relay and said control means energized through an electrical circuit including the closed-circuit contacts of said switch, and means responsive to each search reading operation of said one reading means for interrupting said electrical circuit concurrently to deenergize said second relay and said control means.

11. A data translation system comprising a data printer, first and second cyclically operating reading means for reading individual ones of two record media to derive for each of successive operating cycles of each said reading means and to supply for utilization by said printer individual data and functional-control items of information recorded in individual ones of said media, control means for so controlling the operations of said first and second reading means that in a first operative state of said control means at least one preselected functional-control item of information read by either of said reading means halts the reading operation thereof and initiates reading operation of the other thereof and in a second operative state of said control means each reading of at least one preselected functional-control item of information by one of said reading means halts the operation thereof for one cycle and initiates one cycle of operation of the other of said reading means, means responsive to non-print and print-restore functional-control items of information successively read by either of said reading means for terminating the supply of data thereby to said printer upon reading of said nonprint item of information and until said print-restore item of information is read, means responsive to alternate reading by said one reading means of two further items of preselected functional-control information for alternating said control means between said first and second operative states thereof, and means operative during the interval between the successive reading of said non-print and print-restore items of information for halting said alteration of said control means between said first and second operative states thereof.

References Cited by the Examiner
UNITED STATES PATENTS 2,905,299    9/1959    Hildebrandt _____ 197—20
2,980,225    4/1961    Intagliata et al. _____ 197—1.6

R. C. BAILEY, *Primary Examiner.*

R. A. LEIGHEY, *Examiner.*

R. T. CUNNINGHAM, F. A. LUKSIK, W. M. BECKER,
*Assistant Examiners.*